(12) United States Patent
Shen

(10) Patent No.: US 9,787,127 B2
(45) Date of Patent: Oct. 10, 2017

(54) DOOR LOCK WITH A WIRELESS CHARGING DEVICE

(71) Applicant: I-TEK METAL MFG. CO., LTD., Tainan (TW)

(72) Inventor: Jimmy Shen, Tainan (TW)

(73) Assignee: I-Tek Metal Mfg. Co., Ltd, Tainan (TW)

( * ) Notice: Subject to any disclaimer, the term of this patent is extended or adjusted under 35 U.S.C. 154(b) by 397 days.

(21) Appl. No.: 14/561,263

(22) Filed: Dec. 5, 2014

(65) Prior Publication Data
US 2016/0160530 A1    Jun. 9, 2016

(51) Int. Cl.
*E05C 1/06*    (2006.01)
*H02J 7/02*    (2016.01)
(Continued)

(52) U.S. Cl.
CPC .......... *H02J 7/025* (2013.01); *E05B 47/0012* (2013.01); *E05B 47/0673* (2013.01);
(Continued)

(58) Field of Classification Search
CPC ... E05C 1/08; E05C 1/085; E05C 1/12; E05C 1/16; E05B 13/004; E05B 17/2007; E05B 47/0001; E05B 47/0012; E05B 47/0603; E05B 47/0657; E05B 47/0661; E05B 63/08; E05B 47/0673; E05B 2047/0051; E05B 2047/0058; E05B 2047/0059; E05B 2047/0061; E05B 2047/0082; E05B 55/12; E05B 63/16; E05B 17/22; E05B 2047/0031; E05B 2047/0023; E05B 9/084;
(Continued)

(56) References Cited

U.S. PATENT DOCUMENTS 3,999,411 A * 12/1976 Kambic .................. E05B 55/00
292/165
5,474,348 A * 12/1995 Palmer ................ E05B 47/0012
292/144
(Continued)

FOREIGN PATENT DOCUMENTS

AU    WO 2012126039 A1 *  9/2012  ......... E05B 47/0669
CA          2879422 A1 *  2/2014  ......... E05B 47/0012
(Continued)

*Primary Examiner* — Christine M Mills
(74) *Attorney, Agent, or Firm* — Alan D. Kamrath; Kamrath IP Lawfirm, P.A.

(57) ABSTRACT

A door lock mounted to a door includes a latch head. A receiver includes a charging circuit and is mounted to the door. A battery provides electricity required for moving the latch head between a latching position and an unlatching position or providing electricity required for permitting or not permitting movement of the latch head from the latching position to the unlatching position. A transmitter includes a wireless transmitting circuit and is mounted to a door frame to which the door is pivotably mounted. The transmitter is connected to a power supply. When the door is in an open position, the receiver is not aligned with the transmitter. When the door is in a closed position, the receiver is aligned with the transmitter, the receiver receives a radio wave from the transmitter, converts the radio wave into electricity, and stores the electricity in the battery.

6 Claims, 19 Drawing Sheets

(51) Int. Cl.
*E05B 47/00* (2006.01)
*E05B 47/06* (2006.01)
*E05B 55/12* (2006.01)
*E05B 63/16* (2006.01)
*E05B 17/22* (2006.01)
*E05B 9/08* (2006.01)

(52) U.S. Cl.
CPC .............. *E05B 55/12* (2013.01); *E05B 63/16* (2013.01); *E05B 9/084* (2013.01); *E05B 17/22* (2013.01); *E05B 2047/0023* (2013.01); *E05B 2047/0031* (2013.01); *E05B 2047/0058* (2013.01); *E05B 2047/0059* (2013.01); *E05B 2047/0061* (2013.01)

(58) Field of Classification Search
CPC ........... Y10T 292/097; Y10T 292/0971; Y10T 292/1014; Y10T 292/1015; Y10T 292/1016; Y10T 292/1021; H02J 7/025
USPC .............. 292/164, 165, 138, 139, 140, 144; 70/107–111, 277, 278.7, 279.1, 257, 283
See application file for complete search history.

(56) References Cited

U.S. PATENT DOCUMENTS

| | | | | |
|---|---|---|---|---|
| 5,876,073 A * | 3/1999 | Geringer | ............. | E05B 47/0673 292/144 |
| 6,354,121 B1 * | 3/2002 | Frolov | .................... | E05B 63/08 292/144 |
| 6,456,047 B1 * | 9/2002 | Gohara | .................... | H02J 7/025 320/104 |
| 8,199,011 B2 * | 6/2012 | Lu | .......................... | E05B 45/06 340/542 |
| 8,294,302 B2 * | 10/2012 | Peabody | ................ | E05B 17/22 307/1 |
| 8,354,914 B2 * | 1/2013 | Buckingham | ........... | E05B 47/00 340/5.6 |
| 8,540,290 B2 * | 9/2013 | Chen | ................... | E05B 47/0673 292/144 |
| 9,378,596 B2 * | 6/2016 | Shen | ................... | G07C 9/00087 |
| 2004/0045330 A1 * | 3/2004 | Moon | ................ | E05B 47/0673 70/107 |
| 2007/0146115 A1 * | 6/2007 | Roosli | ..................... | E05B 47/00 340/5.6 |
| 2009/0308116 A1 * | 12/2009 | Lambrou | ................ | E05B 47/02 70/277 |
| 2012/0267962 A1 * | 10/2012 | Hanchett, Jr. | ........... | E05B 17/22 307/104 |
| 2014/0020295 A1 * | 1/2014 | Bonahoom | ......... | E05F 15/2076 49/25 |
| 2014/0197692 A1 * | 7/2014 | Chen | ................... | G07C 9/00174 307/104 |
| 2014/0260459 A1 * | 9/2014 | Nguyen | .............. | H01M 10/425 70/431 |
| 2016/0017638 A1 * | 1/2016 | Dore Vasudevan | .... | E05B 17/22 292/137 |
| 2016/0060904 A1 * | 3/2016 | Dore Vasudevan | | E05B 47/0673 292/144 |
| 2016/0153213 A1 * | 6/2016 | Huang | .................... | E05B 63/08 292/144 |
| 2016/0163139 A1 * | 6/2016 | Kankkunen | ........ | G07C 9/00309 70/91 |
| 2016/0215524 A1 * | 7/2016 | Yoshikawa | ......... | E05B 47/0002 |
| 2016/0322847 A1 * | 11/2016 | Geiszler | ................. | H02J 7/025 |
| 2016/0322855 A1 * | 11/2016 | Geiszler | ................. | H02J 7/025 |
| 2017/0002586 A1 * | 1/2017 | Lee | ...................... | E05B 47/0012 |
| 2017/0018956 A1 * | 1/2017 | Geiszler | ................. | H02J 50/10 |
| 2017/0040827 A1 * | 2/2017 | Weber | .................... | H02J 7/025 |

FOREIGN PATENT DOCUMENTS

| | | | | |
|---|---|---|---|---|
| CH | EP 0425431 A1 * | 5/1991 | ......... | E05B 47/0688 |
| DE | EP 3059359 A1 * | 8/2016 | ............ | E05B 47/00 |
| EP | 1617020 A2 * | 1/2006 | ......... | E05B 47/0673 |
| JP | S646479 A * | 1/1989 | | |
| JP | 2013096174 A * | 5/2013 | ............ | E05B 17/22 |

* cited by examiner

DOOR LOCK WITH A WIRELESS CHARGING DEVICE

BACKGROUND OF THE INVENTION

The present invention relates to a door lock with a wireless charging device and, more particularly, to a door lock that can be electrically locked by actuating an electric driving device of the door lock through wire or wireless control and that can wirelessly charge a battery of the electric driving device while the door is closed.

A type of door lock includes a latch device having a latch mounted in a door and includes inner and outer operating devices mounted to inner and outer sides of the door for driving the latch from a latching position to an unlatching position. A lock core is mounted to the outer side of the door and can be used to lock the latch device to prevent movement of the latch head from the latching position to the unlatching position by operating the outer operating device (namely, a user can only use a key to operate the lock core for unlatching purposes) while permitting an unlatching operation of the latch head by the inner operating device. Thus, unauthorized access to the door can be avoided by manual operation.

Due to development of technologies, prevention of unauthorized access to the door can cooperate with an electric burglarproof system or an electric control system. Specifically, the door can be operated by the electric burglarproof system or the electric control system, and the status of the door can be fed back to the electric burglarproof system or the electric control system. Conventional mechanical door locks cannot lock the door by wired or wireless control. In view of this drawback, a door lock with a locking function using a solenoid switch connected to the latch device is proposed. In another approach, a motor capable of rotating in opposite directions is used to drive a mechanism in the door lock to lock or unlock the door lock. Electricity is required in door locks using either a solenoid or a motor, and the door locks are generally electrically connected to a mains power or include a battery to provide the electricity. If the door lock is connected by wires to the mains power, the wires are apt to wear or be damaged due to repeated bending, because the door lock is mounted on a movable door. Furthermore, the wire connection of the movable door to the mains power is troublesome. On the other hand, the battery can avoid the wire connection problems but has a limited capacity of electricity storage, requiring frequent replacement of the battery while having difficulties in knowing the remaining amount of electricity. As a result, if the battery is out of electricity and a user is not aware, the user cannot control locking/unlocking of the door lock, leading to safety risks or inconvenience.

Thus, a need exists for a door lock with a wireless charging device to mitigate and/or obviate the above disadvantages.

BRIEF SUMMARY OF THE INVENTION

The present invention solves this need and other problems in the field of reliable operation of electric locking/unlocking functions by providing a door lock with a wireless charging device.

A door lock according to the present invention includes a latch head slideable in a transverse direction between a latching position and an unlatching position. The door lock is adapted to be mounted to a door. The latch head in the latching position does not permit pivotal movement of the door from a closed position to an open position. The latch head in the unlatching position permits pivotal movement of the door from the closed position to the open position. A receiver includes a charging circuit and an antenna electrically connected to the charging circuit. The receiver is adapted to be mounted to the door and is adapted to pivot together with the door between the open position and the closed position. A battery provides electricity required for moving the latch head between the latching position and the unlatching position or providing electricity required for permitting or not permitting movement of the latch head from the latching position to the unlatching position. A transmitter includes a wireless transmitting circuit and an antenna electrically connected to the wireless transmitting circuit. The transmitter is adapted to be mounted to a door frame to which the door is pivotably mounted. The transmitter is adapted to be connected to a power supply.

When the door is in the open position, the receiver is not aligned with the transmitter. When the door is in the closed position, the receiver is aligned with the transmitter, the receiver receives a radio wave from the transmitter, converts the radio wave into electricity, and stores the electricity in the battery.

The door lock can further include a case adapted to be mounted in the door. The case includes a chamber. The latch head is slideably received in the chamber. An unlatching mechanism can be pivotably received in the chamber and can include a follower portion operatively connected to the latch head. The follower portion is pivotable between a release position and a pressing position. A locking mechanism can be mounted in the chamber and electrically connected to the battery. The locking mechanism includes a locking block movable between a front position and a rear position. The battery provides electricity required for moving the locking block between the front position and the rear position. When the latch head is in the latching position, if the unlatching mechanism pivots from the release position towards the pressing position, the latch head moves from the latching position towards the unlatching position. When the unlatching mechanism is in the pressing position, the latch head is in the unlatching position. When the locking block is in the front position, pivotal movement of the unlatching mechanism from the release position to the pressing position is not permitted. When the locking block is in the rear position, pivotal movement of the unlatching mechanism from the release position to the pressing position is permitted.

The door lock can further include a base fixed in the chamber. The base includes a track and a groove in communication with the track. The locking block is slideably received in the track of the base and includes a receiving groove. The locking block is limited by the track and is movable in the transverse direction between the front position adjacent to the unlatching mechanism and the rear position distant to the unlatching mechanism. A shaft can be mounted in the receiving groove of the locking block. A first sliding block can be slideably mounted on the shaft. The first sliding block is limited by the shaft and is movable in the transverse direction between a central position in a central portion of the receiving groove and a non-central position not in the central portion of the receiving groove. A first compression spring can be mounted around the shaft. A second compression spring can be mounted around the shaft. The first sliding block is located between the first and second compression springs. The first and second compression springs bias the first sliding block to the central position. An electric driving device can be mounted in the groove of the base and is electrically connected to the battery. The electric driving device includes a driving shaft having a threaded section at an intermediate portion thereof. The driving shaft is controlled to rotate in a forward direction or a reverse direction opposite to the forward direction. A second sliding block includes a screw hole in threading connection with the threaded section of the driving shaft. A follower plate includes a first portion coupled to the first sliding block and a second portion coupled to the second sliding block. When the driving shaft rotates in the forward direction, the second sliding block, the follower plate, and the first sliding block move towards the unlatching mechanism. When the driving shaft rotates in the reverse direction, the second sliding block, the follower plate, and the first sliding block move away from the unlatching mechanism. When the unlatching mechanism is in the release position, rotation of the driving shaft in the forward direction causes movement of the locking block from the rear position towards the front position. When the unlatching mechanism is in the pressing position, the locking block is blocked by the unlatching mechanism, and rotation of the driving shaft in the forward position causes the first sliding block to move from the central position to the non-central position and to compress the first compression spring, permitting the locking block to be retained in the rear position. When the locking block is in the rear position, the locking block disengages from the unlatching mechanism, permitting the unlatching mechanism to move from the release position to the pressing position. When the locking block is in the front position, the locking block engages with the unlatching mechanism, not permitting the unlatching mechanism to move from the release position to the pressing position. When the locking block is in the front position, rotation of the driving shaft in the reverse direction causes movement of the locking block from the front position to the rear position.

The door lock can further include a third compression spring mounted around the driving shaft and a fourth compression spring mounted around the driving shaft. The second sliding block is located between the third and fourth compression springs. When the locking block moves from the rear position towards the front position, the second sliding block compresses the third compression spring. When the locking block moves from the front position to the rear position, the second sliding block compresses the fourth compression spring. When the locking block is in the front position, if the driving shaft keeps rotating in the forward direction, the second sliding block keeps compressing the third compression spring, the screw hole of the second sliding block disengages from the threaded section of the driving shaft, and the third compression spring biases the screw hole of the second sliding block to abut an end of the threaded section of the driving shaft. When the locking block is in the rear position, if the driving shaft keeps rotating in the reverse direction, the second sliding block keeps compressing the fourth compression spring, the screw hole of the second sliding block disengages from the threaded section of the driving shaft, and the fourth compression spring biases the screw hole of the second sliding block to abut another end of the threaded section of the driving shaft.

The locking block can include a wider portion and a narrower portion. The wider portion includes two outer surfaces spaced from each other in a width direction perpendicular to the transverse direction and an end face extending between the two outer surfaces. The narrower portion includes two inner faces between the two outer surfaces in the width direction. A locking groove is formed in the end face of the wider portion. The locking block can further include a through-hole extending from one of the two inner faces through the other inner face. The wider portion of the locking block is located outside of the track of the base. The narrower portion is located in the track. The base further includes first and second sides spaced from each other in the width direction. The unlatching mechanism further includes a first driven ring, a second driven ring, and a first follower ring between the first and second driven rings. The first and second driven rings are coupled to and jointly pivotable with the first follower ring. The first driven ring includes a first protrusion on an outer periphery thereof. The second driven ring includes a first projection on an outer periphery thereof. The follower portion is formed on the outer periphery of the first follower ring. The case further includes a side having a first pivotal hole pivotably receiving the first driven ring. The case further includes a first screw hole aligned with the wider portion of the locking block. The door lock can further include a lid mounted to the case to close the chamber. The lid includes a second pivotal hole pivotably receiving the second driven ring. The lid further includes a second screw hole aligned with the wider portion of the locking block. A cover plate is mounted to the first side of the base. A spacing between the two inner faces of the locking block is smaller than a spacing between a bottom of the track and an inner face of the cover plate. A guiding block can be slideably received in the through-hole of the locking block. The guiding block includes two ends respectively abutting the bottom of the track and the inner face of the cover plate, permitting the locking block to move in an axial direction of the guiding block parallel to the width direction between a first position adjacent to the side of the case and a second position adjacent to the lid. The guiding block and the locking block are jointly movable between the front position and the rear position. A switching screw can be selectively engaged with the first screw hole of the case or the second screw hole of the lid. When the switching screw engages with the first screw hole of the case, the switching screw biases the locking block to the second position, the locking groove of the locking block is aligned with the first projection of the second driven ring in the axial direction of the guiding block, and the locking groove of the locking block is spaced from the first protrusion of the first driven ring in the axial direction of the guiding block. When the switching screw engages with the second screw hole of the lid, the switching screw biases the locking block to the first position, the locking groove of the locking block is aligned with the first protrusion of the first driven ring in the axial direction of the guiding block, and the locking groove of the locking block is spaced from the first projection of the second driven ring in the axial direction of the guiding block. When the locking block is in the first position and moves from the rear position to the front position, the locking groove of the locking block engages with the first protrusion of the first driven ring. When the locking block is in the second position and moves from the rear position to the front position, the locking groove of the locking block engages with the first projection of the second driven ring.

The base can further include a first sliding groove extending from the second side towards the first side of the base and intercommunicating with the groove. The cover plate can further include a second sliding groove aligned with the first sliding groove. The second sliding block can include a first lug and a second lug. The first lug is slideably received in the first sliding groove of the base. The second lug is slideably received in the second sliding groove of the cover plate.

The base can further include a positioning groove located between the track and the groove and intercommunicated with the groove. The driving shaft further includes an end distant to the threaded section of the driving shaft. The door lock can further include a pivotal block detachably received in the positioning groove of the base. The pivotal block includes a pivotal hole. The end of the driving shaft is pivotably received in the pivotal hole of the pivotal block.

The threaded section of the driving shaft can have a length in the transverse direction slightly larger than a spacing between the rear position and the front position of the locking block in the transverse direction.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
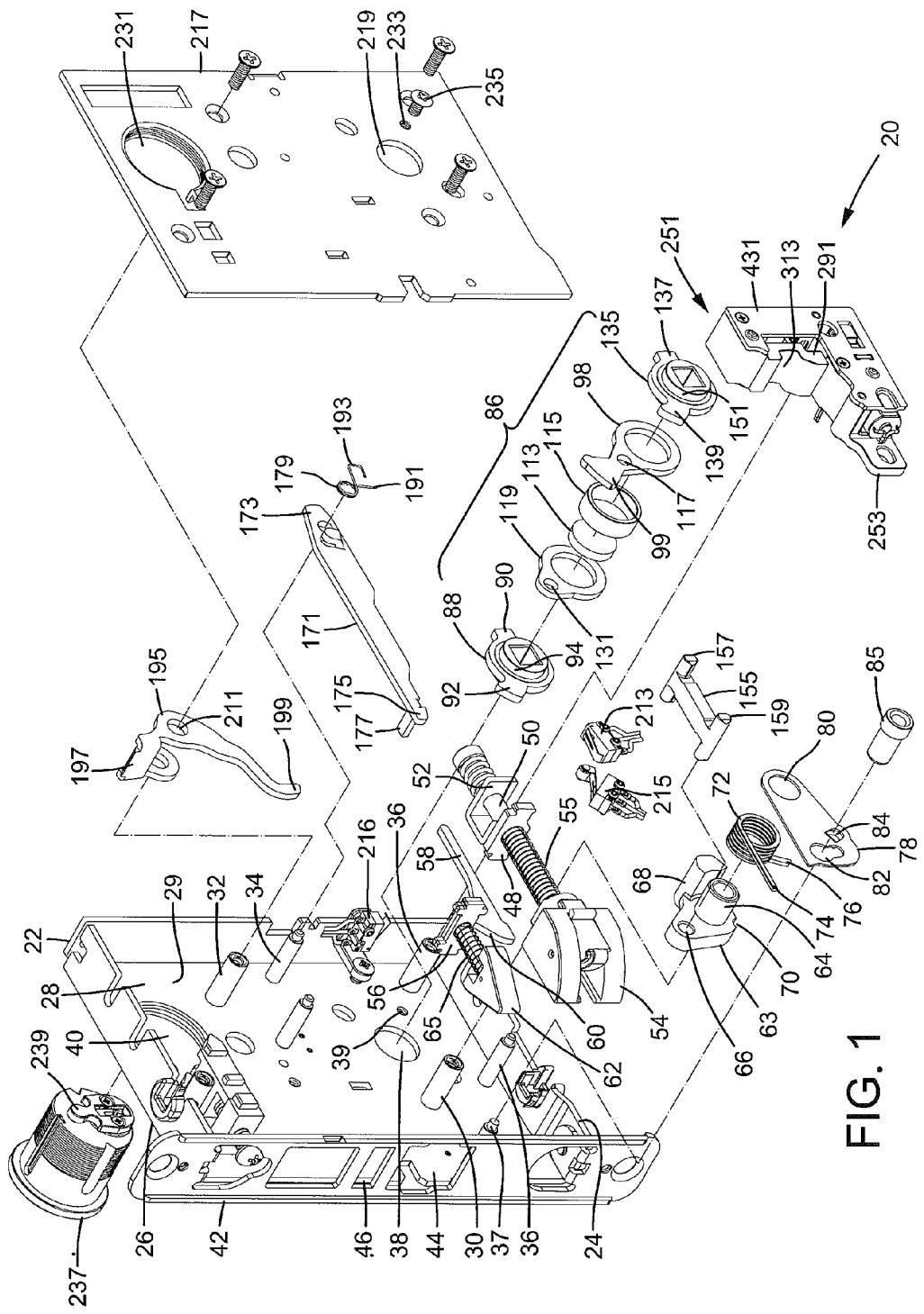
FIG. 1 is an exploded, perspective view of a door lock according to the present invention.
Figure 2:
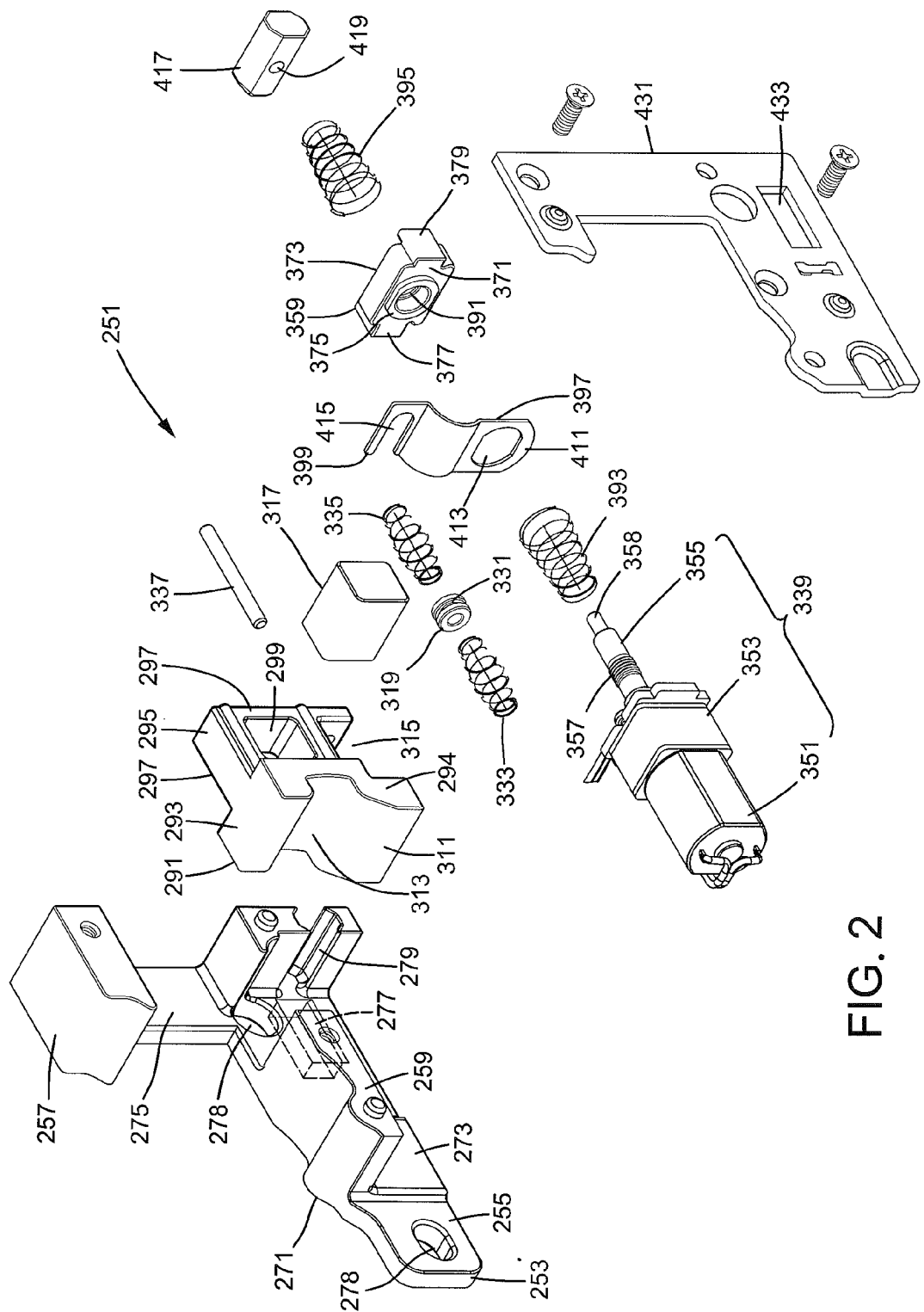
FIG. 2 is an exploded, perspective view of a locking mechanism of the door lock of FIG. 1.
Figure 3:
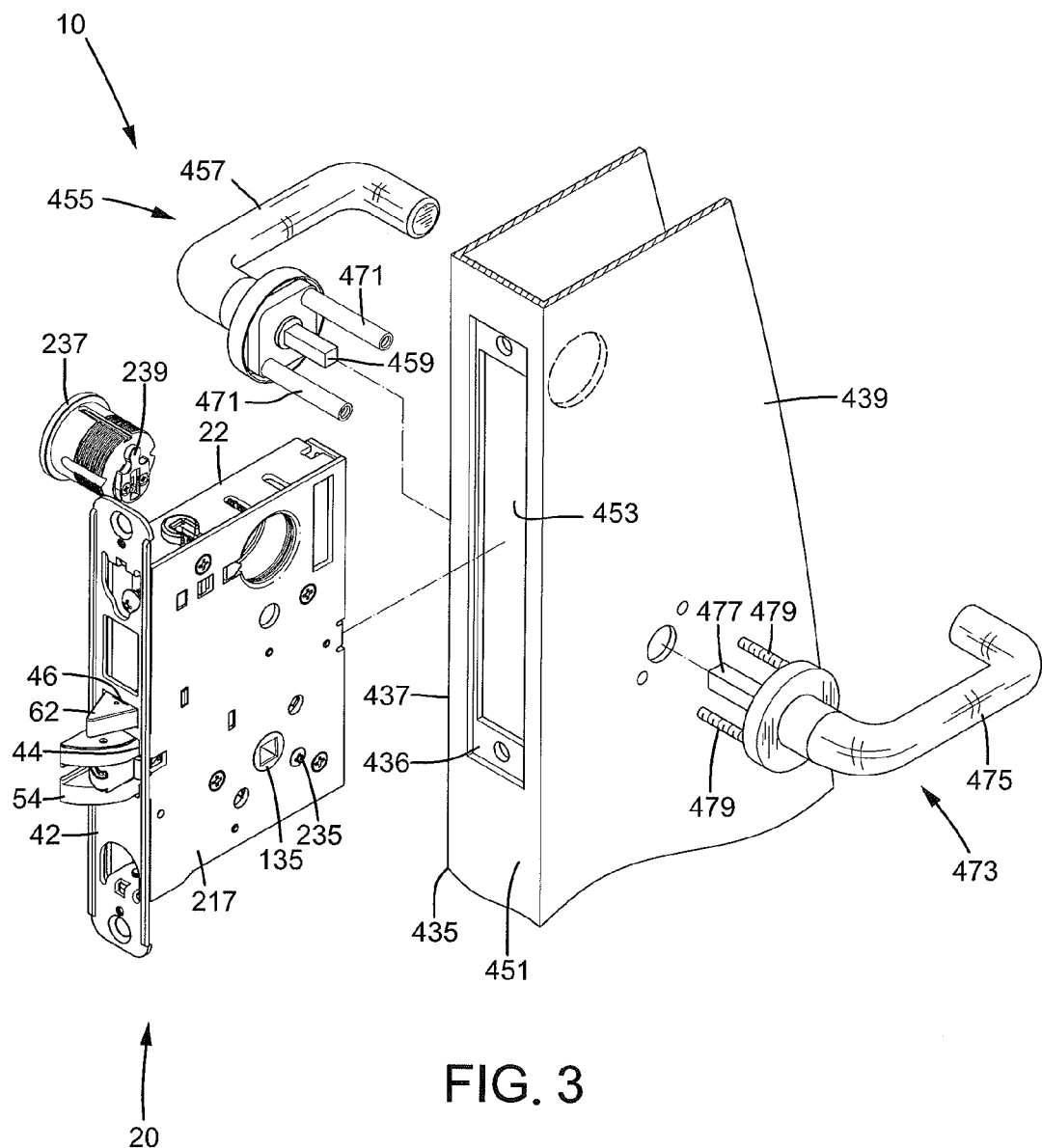
FIG. 3 is a partly exploded perspective view of the door lock of FIG. 1 and a door to which the door lock is mounted.
Figure 3A:
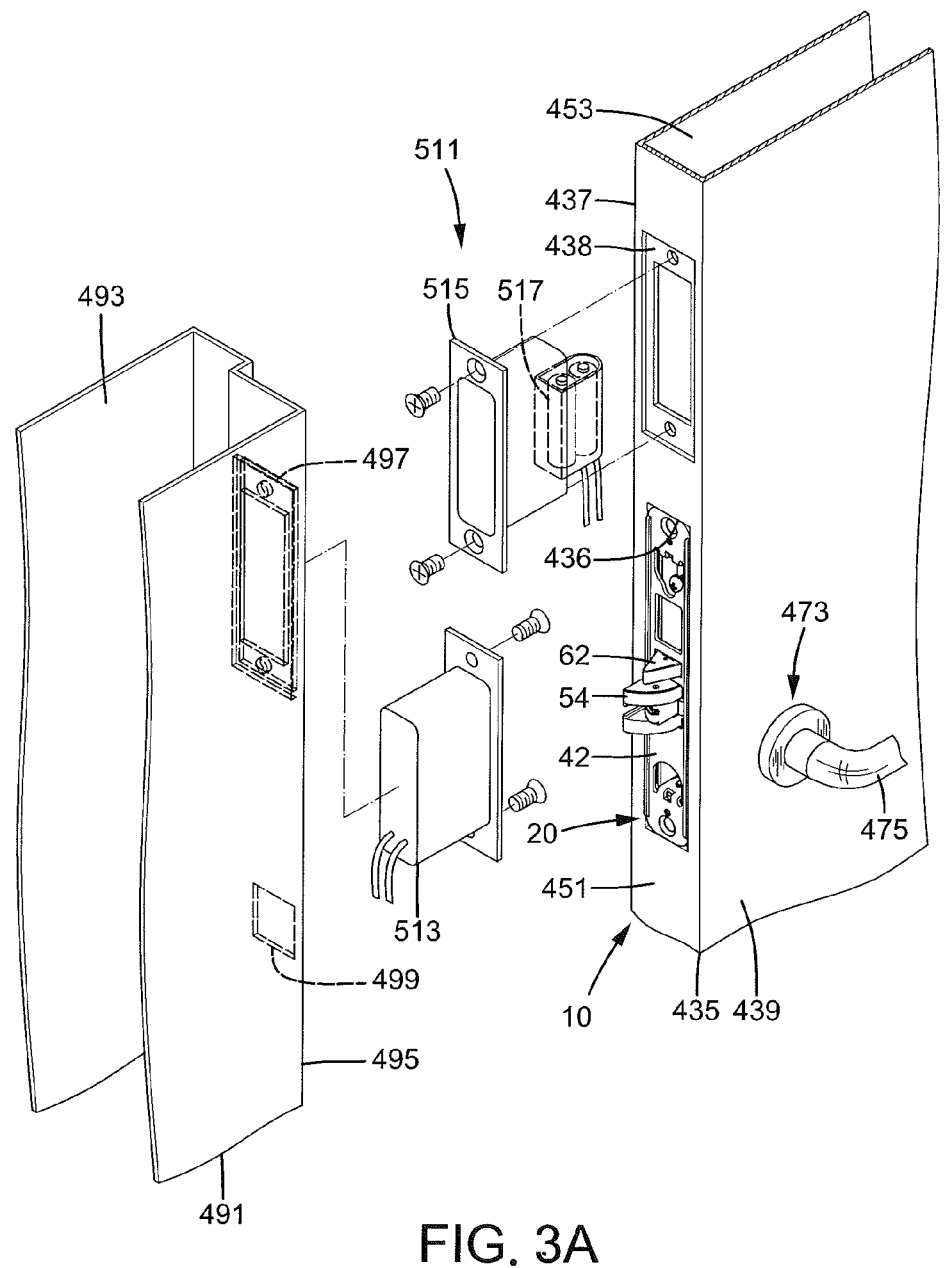
FIG. 3A is a partly exploded perspective view of the door lock and the door of FIG. 3 with a wireless charging device exploded.
Figure 4:
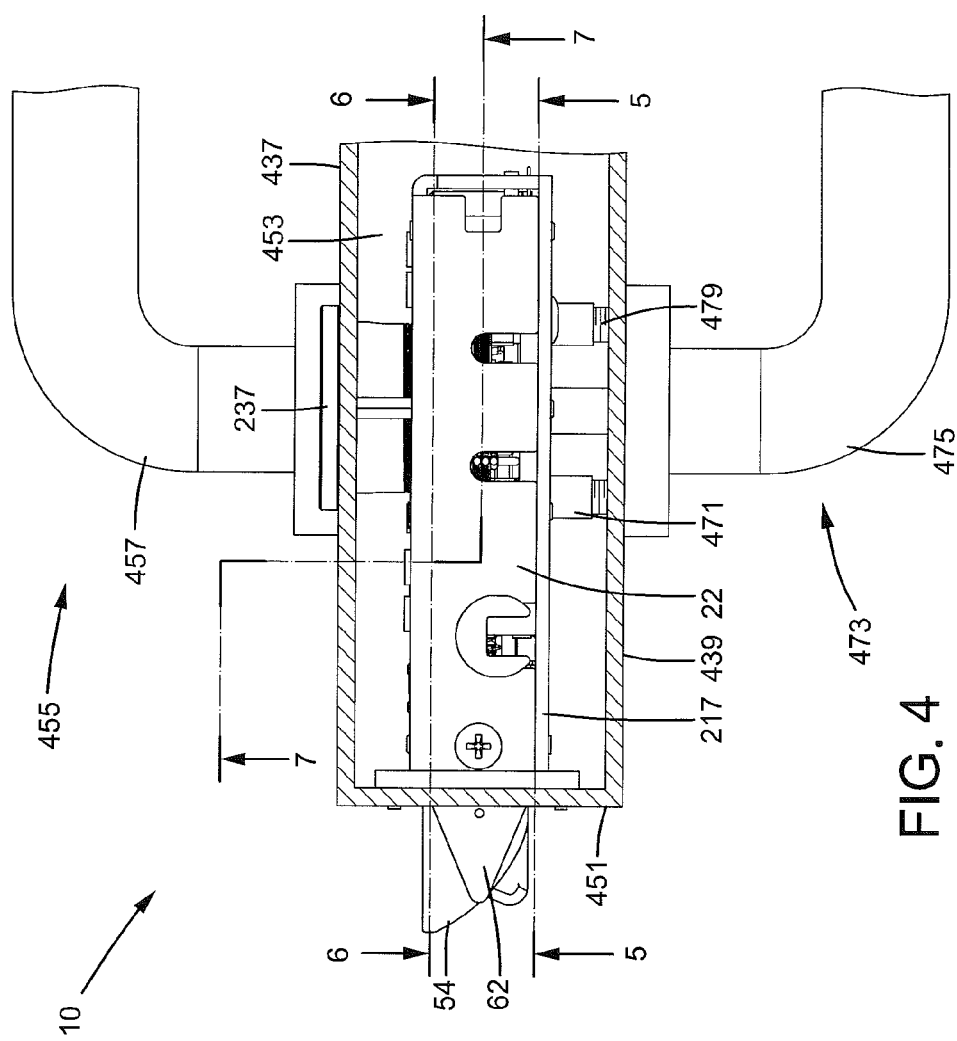
FIG. 4 is a cross sectional view of the door lock and the door of FIG. 3 according to a horizontal section plane.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "third", "fourth", "bottom", "side", "end", "portion", "section", "front", "rear", "horizontal", "vertical", "transverse", "axial", "circumferential", "spacing", "length", "width", and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE INVENTION

A door lock is shown in the drawings and generally designated 10. Door lock 10 includes a latch device 20 and first and second operating devices 455 and 473 for operating latch device 20. Latch device 20 includes a case 22 having first and second sides 24 and 26 spaced from each other in a vertical direction and an end face between first and second sides 24 and 26. A faceplate 42 is mounted to the end face of case 22. Case 22 further includes a side 29 extending between first and second sides 24 and 26 and faceplate 42, defining a chamber 28 between first and second sides 24 and 26, faceplate 42, and side 29. Formed on side 29 and located in chamber 28 are first, second, and third axles 30, 32, and 34, two first pegs 36, and a second peg 37. Side 29 includes a first pivotal hole 38, a first screw hole 39, and a first engagement hole 40. First and second axles 30 and 32 are located between first engagement hole 40 and first pivotal hole 38 in the vertical direction. Third axle 34 is located between first and second axles 30 and 32 in the vertical direction. First pivotal hole 38 is located between first axle 30 and first screw hole 39 in a transverse direction perpendicular to the vertical direction. Faceplate 42 includes first and second holes 44 and 46 in communication with chamber 28.

According to the form shown, a lid 217 is detachably mounted to an open side of case 22 to close chamber 28. Lid 217 includes a second pivotal hole 219 aligned with first pivotal hole 38 of case 22, a second screw hole 233 aligned with first screw hole 39 of case 22, and a second engagement hole 231 aligned with first engagement hole 40 of case 22.

Figure 8:
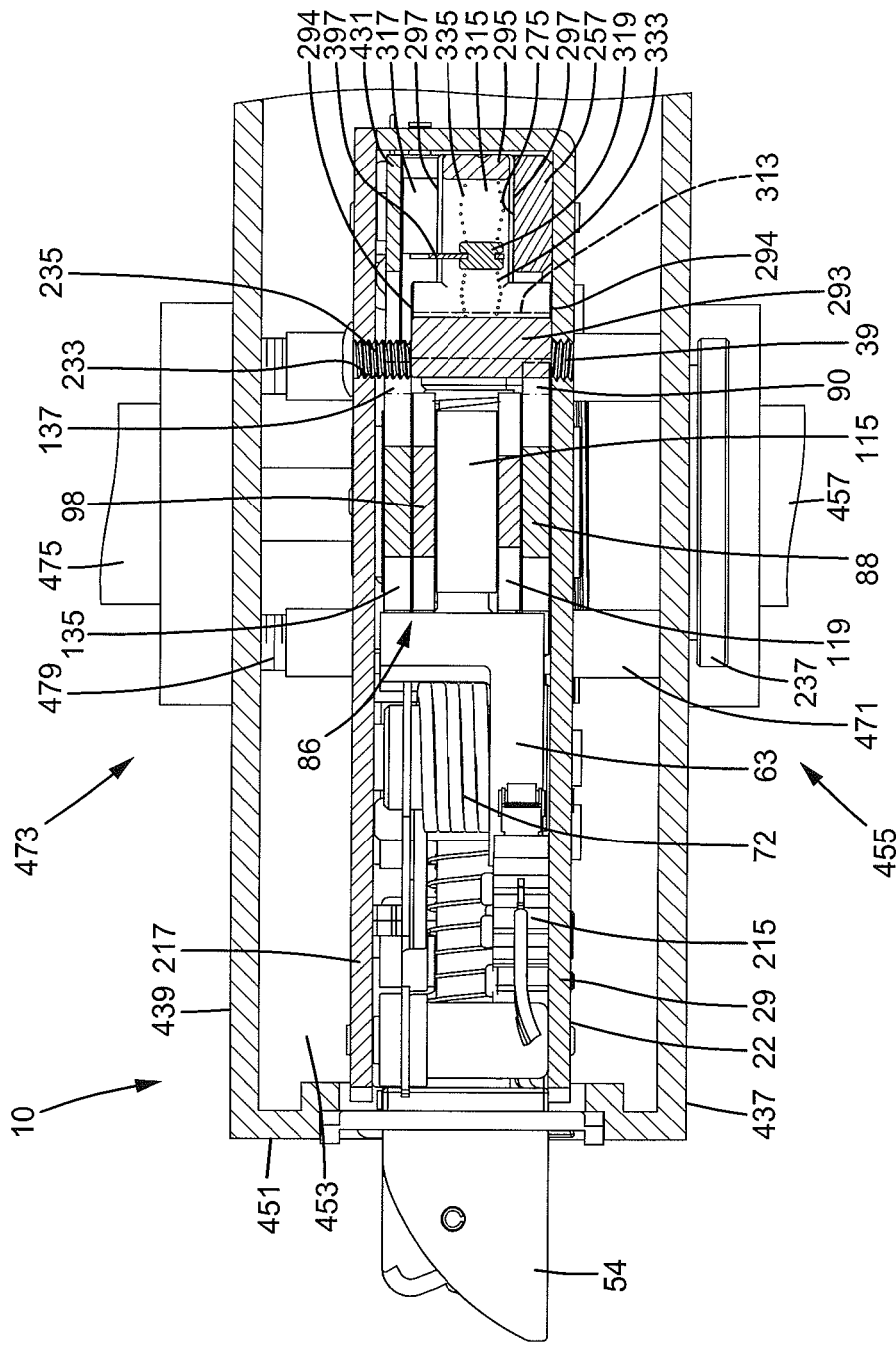
FIG. 8 is a cross sectional view taken along section line 8-8 of FIG. 5 with a switching screw coupled with a second screw hole and with a locking block biased to a first position.
Figure 9:
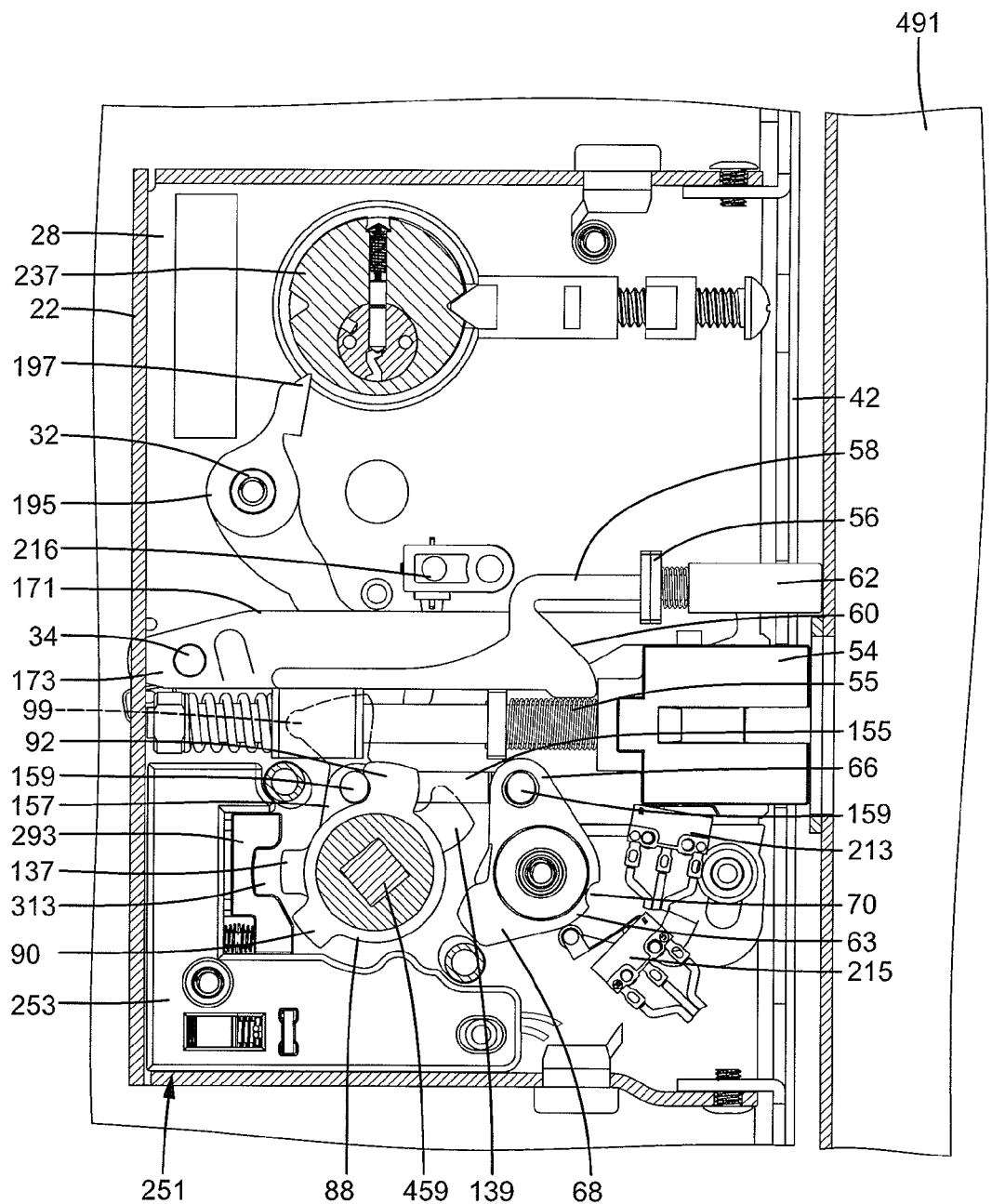
FIG. 9 is a view similar to FIG. 6 with a first handle of a first operating device of the door lock rotated and with a latch moved from a latching position to an unlatching position.

According to the form shown, latch device 20 further includes a latch head 54 slideably received in chamber 28 of case 22 and a safety bolt 62. A shank 50 is fixed to an end of latch head 54. A first positioning plate 48 is fixed to side 29 of case 22. Shank 50 slideably extends through first positioning plate 48. A first spring 55 is mounted around shank 50 and is between latch head 54 and first positioning plate 48. A connecting member 52 is mounted to a rear end of first positioning plate 48. Latch head 54 is aligned with first hole 44 of faceplate 42. Thus, latch head 54, shank 50, and connecting member 52 are jointly moveable between a latching position in which latch head 54 extends beyond faceplate 42 (FIGS. 5, 6, and 8) and an unlatching position in which latch head 54 retracts into case 22 and compresses first spring 55 (FIG. 9).

Figure 5:
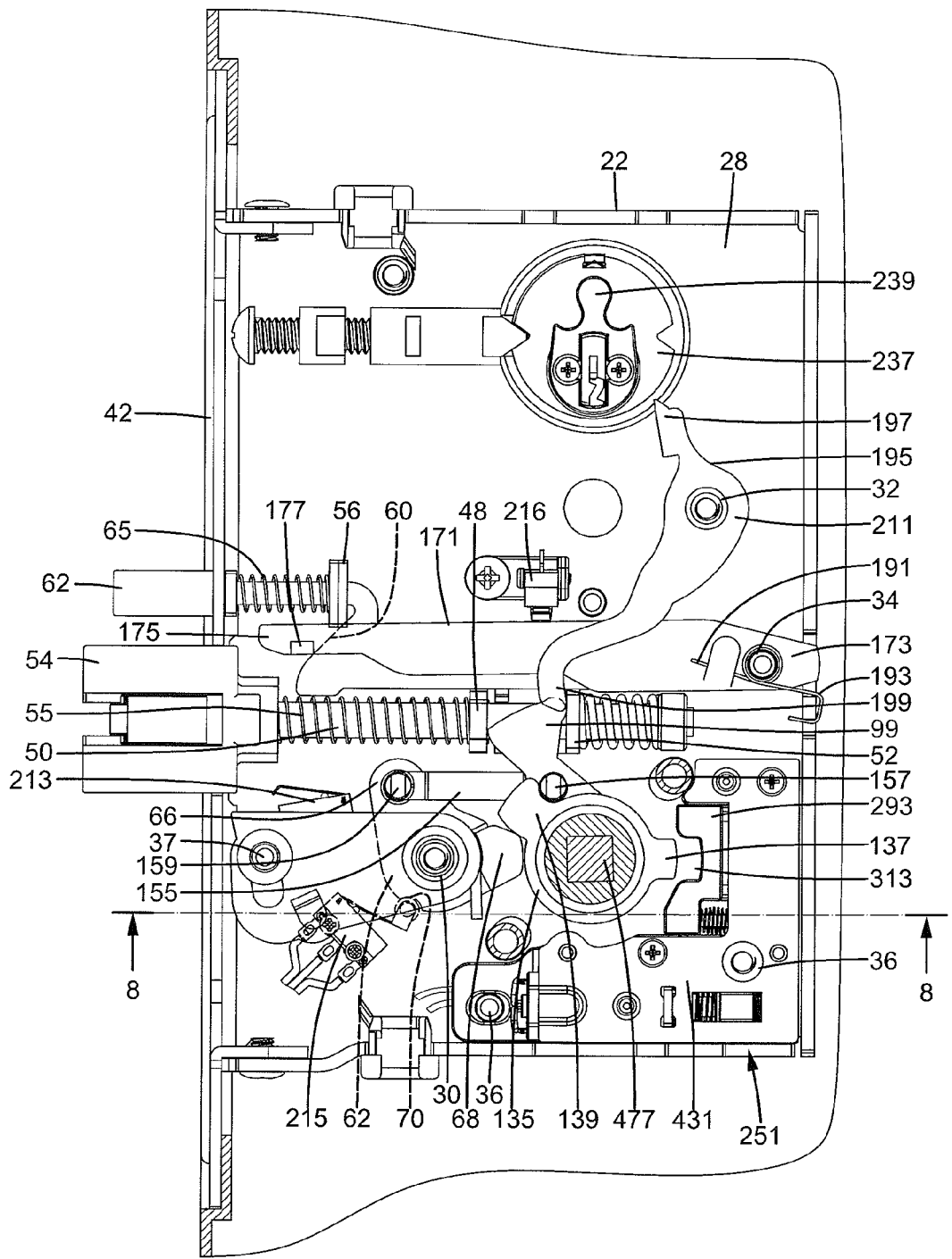
FIG. 5 is a cross sectional view taken along section line 5-5 of FIG. 4.
Figure 6:
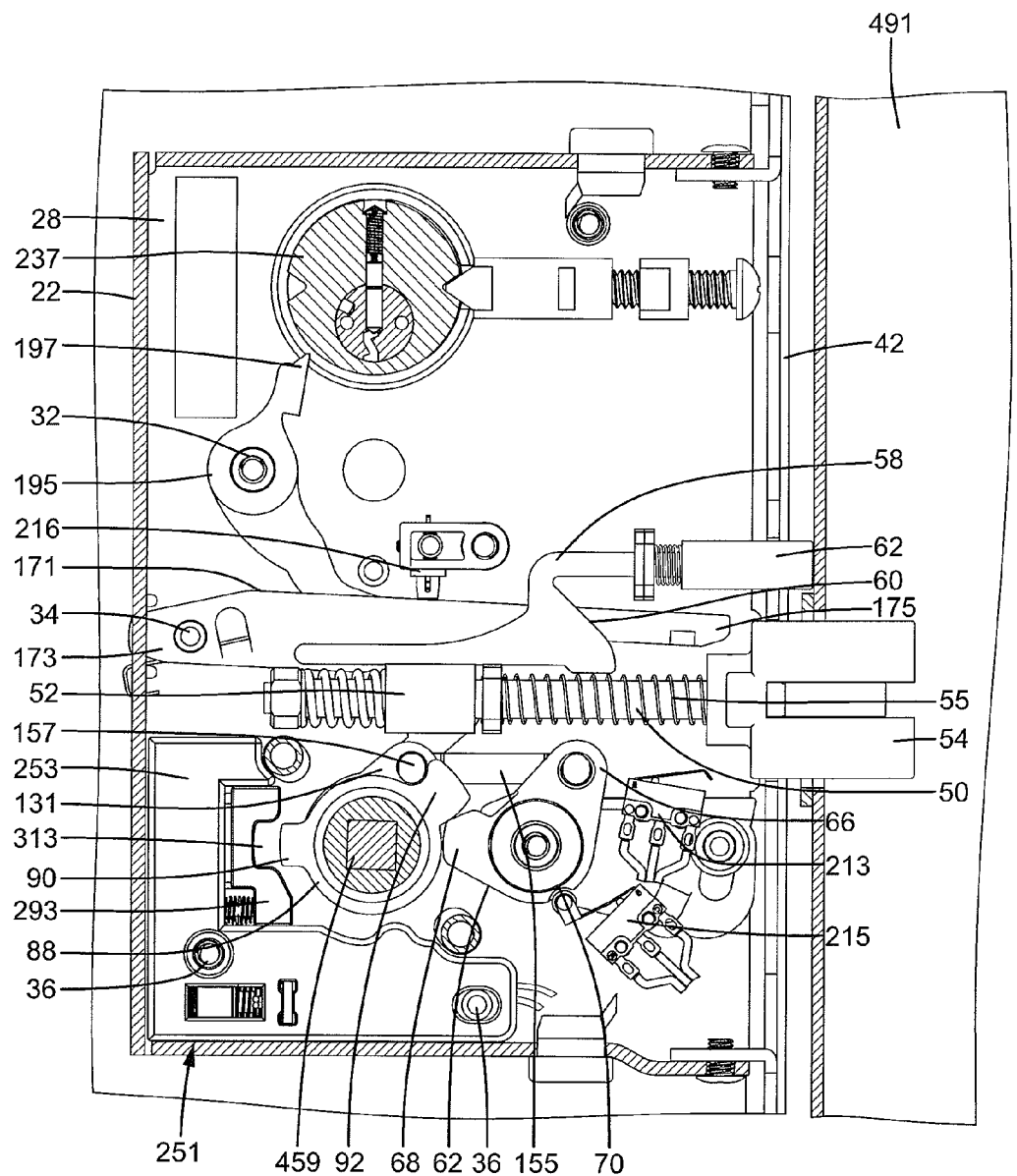
FIG. 6 is a cross sectional view taken along section line 6-6 of FIG. 4.

According to the form shown, a stem 58 is fixed to an end of safety bolt 62. Stem 58 includes a push face 60 on an intermediate portion thereof. Push face 60 is a slant in the form shown. A second positioning plate 56 is fixed to side 29 of case 22. Stem 58 slideably extends through second positioning plate 56. A second spring 65 is mounted around stem 58 and is located between safety bolt 62 and second positioning plate 56. Safety bolt 62 is aligned with second hole 46 of faceplate 42. Push face 60 of stem 58 is located behind latch head 54 in the transverse direction. Thus, when latch head 54 is in the latching position, safety bolt 62 is biased by second spring 65 and is retained in a position extending beyond faceplate 42 (FIGS. 5, 6, and 8). When latch head 54 moves from the latching position to the unlatching position, latch head 54 presses against push face 60 to move safety bolt 62 in the transverse direction to a retracted position.

According to the form shown, latch device 20 further includes a returning member 63 pivotably mounted to first axle 30 of case 22. Returning member 63 includes a pivotal portion 64 on a side of returning member 63, a connecting end 66, and a stop portion 68. Pivotal portion 64 is tubular in the form shown. Connecting end 66 and stop portion 68 are spaced from each other in a circumferential direction about a first pivot axis defined by first axle 30. A recess 70 is formed in an outer periphery of returning member 63 and is located between connecting end 66 and stop portion 68 in the circumferential direction about the first pivot axis defined by first axle 30. Pivotal portion 64 of returning member 63 is pivotably connected to first axle 30. Thus, returning member 63 can pivot about the first pivot axis.

According to the form shown, a first torsion spring 72 is mounted around pivotal portion 64 of returning member 63. First torsion spring 72 includes a first tang 74 and a second tang 76 abutting stop portion 68 of returning member 63.

According to the form shown, latch device 20 further includes a positioning board 78 and an axle sleeve 85 received in chamber 28 of case 22. Positioning board 78 includes first and second fixing holes 80 and 82 spaced from each other. Positioning board 78 further includes an engagement portion 84 between first and second fixing holes 80 and 82. First fixing hole 80 receives pivotal portion 64 of returning member 63. Axle sleeve 85 is received in second fixing hole 82 and is mounted around second peg 37 of case 22. Thus, positioning board 78 can not rotate. First torsion spring 72 is located between returning member 63 and positioning board 78. First tang 74 of first torsion spring 72 engages with engagement portion 84 of positioning board 78. Thus, returning member 63 is biased by first torsion spring 72.

According to the form shown, latch device 20 further includes an unlatching mechanism 86 pivotably mounted between case 22 and lid 217. Unlatching mechanism 86 includes first and second driven rings 88 and 135 having an identical shape in the form shown. Unlatching mechanism 86 further includes first and second follower rings 98 and 119, a spacer plate 113, and a spacer ring 115, all of which are mounted between first and second driven rings 88 and 135. First driven ring 88 includes first and second protrusions 90 and 92 on an outer periphery thereof. First driven ring 88 further includes two bosses 94 on two sides thereof. Second driven ring 135 includes first and second projections 137 and 139 on an outer periphery thereof. Second driven ring 135 further includes two bosses 151 on two sides thereof. One boss 94 of first driven ring 88 is pivotably mounted in first pivotal hole 38 of case 22. One boss 151 of second driven ring 135 is pivotably received in second pivotal hole 219 of lid 217. Thus, first and second driven rings 88 and 135 are aligned with each other.

Figure 10:
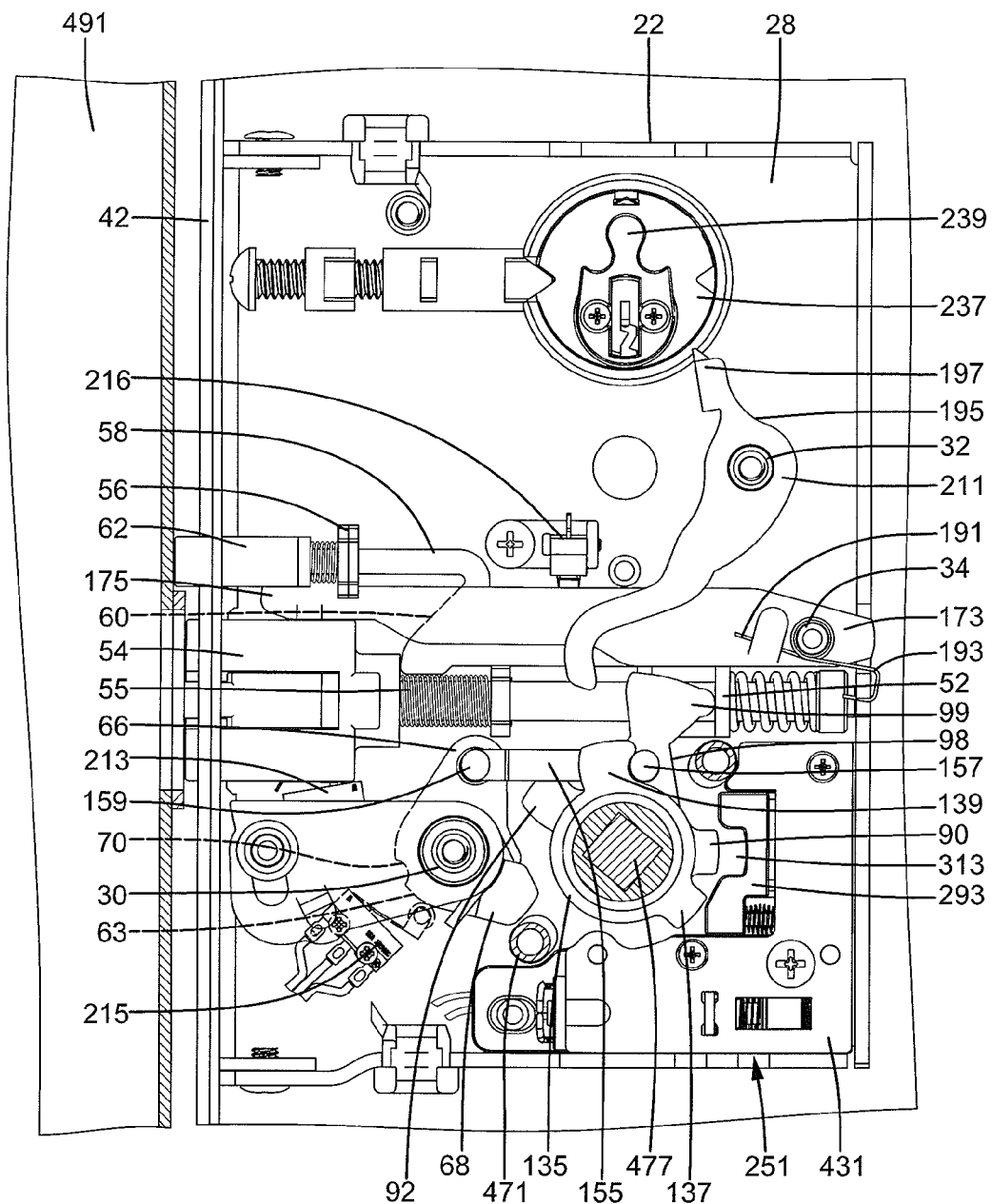
FIG. 10 is a view similar to FIG. 5A with a second handle of a second operating device of the door lock rotated and with the latch moved from the latching position to the unlatching position.

A follower portion 99 is formed on an outer periphery of first follower ring 98 and includes a first engagement hole 117. The other boss 151 of second driven ring 135 is pivotably received in first follower ring 98. Second follower ring 119 includes a second engagement hole 131 spaced from a center of second follower ring 119 in a radial direction. The other boss 94 of first driven ring 88 is pivotably received in second follower ring 119. Follower portion 99 of first follower ring 98 abuts an inner face of connecting member 52. Spacer ring 115 is located between first and second follower rings 98 and 119. Spacer plate 113 is received in spacer ring 115. Thus, first follower ring 98 is pivotable about a pivot axis defined by first and second pivotal holes 38 and 219 between a release position (FIGS. 5 and 6) and a pressing position (FIGS. 9 and 10). When first follower ring 98 of unlatching mechanism 86 pivots, follower portion 99 of first follower ring 98 presses against and moves connecting member 52 in the transverse direction, moving latch head 54 from the latching position to the unlatching position.

According to the form shown, latch device 20 further includes a bridging member 155. Bridging member 155 includes first engagement end 157 pivotably received in first engagement hole 117 of first follower ring 98 and second engagement hole 131 of second follower ring 119. Bridging member 155 further includes a second engagement end 159 pivotably connected to the connecting end 66 of returning member 63. When first driven ring 88 or second driven ring 135 of unlatching mechanism 86 pivots, second protrusion 92 of first driven ring 88 or second projection 139 of second driven ring 135 presses against first engagement end 157 of bridging member 155 to pivot first and second follower rings 98 and 119 from the release position to the pressing position. At the same time, bridging member 155 drives returning member 63 to pivot and to twist first torsion spring 72 by second tang 76, thereby creating a returning force. Thus, first torsion spring 72 can bias first follower ring 98 of unlatching mechanism 86 to the release position. When first follower ring 98 is in the release position, stop portion 68 of returning member 63 abuts second protrusion 92 of first driven ring 88 and second projection 139 of second driven ring 135 (FIGS. 5 and 6).

According to the form shown, latch device 20 further includes an unlatching member 195 pivotably received in chamber 28 of case 22. Unlatching member 195 includes first and second ends 197 and 199 and a pivotal portion 211 between first and second ends 197 and 199. Pivotal portion 211 of unlatching member 195 is pivotably connected to second axle 32 of case 22. First end 197 of unlatching member 195 is located adjacent to first engagement hole 40 of case 22. Second end 199 of unlatching member 195 abuts the inner face of connecting member 52. Unlatching member 195 is pivotable about a second pivot axis defined by second axle 32. When unlatching member 195 pivots, connecting member 52 is pressed to move in the transverse direction by unlatching member 195, which, in turn, moves latch head 54 from the unlatching position to the latching position.

According to the form shown, latch device 20 further includes a stop member 171 pivotably received in chamber 28 of case 22. Stop member 171 includes a pivotal end 173 and a stop end 175. Stop member 171 further includes a follower arm 177 on stop end 175 and located on a side of stop member 171. Pivotal end 173 of stop member 171 is pivotably connected to third axle 34 of case 22. Thus, stop member 171 is pivotable about a third pivot axis defined by third axle 34. A second torsion spring 179 is mounted around third axle 34 and abuts stop member 171. Second torsion spring 179 includes a first tang 191 engaged with stop member 171 and a second tang 193 engaged with case 22. Second torsion spring 179 biases stop end 175 of stop member 171 towards latch head 54.

According to the form shown, latch device 20 further includes a locking mechanism 251 received in chamber 28 of case 22. Locking mechanism 251 includes a base 253 having a substantially L-shaped first portion 255 and a second portion 257. Base 253 further includes first and second sides 259 and 271, a groove 273 in first side 259 and in first portion 255, and a positioning groove 279 spaced from groove 273. Base 253 further includes a track 275 in first side 259 and in second portion 257. Track 275 intercommunicates with groove 273. Two positioning holes 278 extend from a bottom wall of groove 273 to second side 271. Base 253 includes a first sliding groove 277 extending from the bottom wall of groove 273 through second side 271 and located adjacent to positioning groove 279. Positioning holes 278 of base 253 respectively receive first pegs 36. First portion 255 of base 253 is located below unlatching mechanism 86 in the vertical direction. Second portion 257 is located between unlatching mechanism 86 and side 29 of case 22.

A cover plate 431 is mounted to first side 259 of base 253. Cover plate 431 includes a second sliding groove 433 aligned with first sliding groove 277 of base 253.

Figure 7:
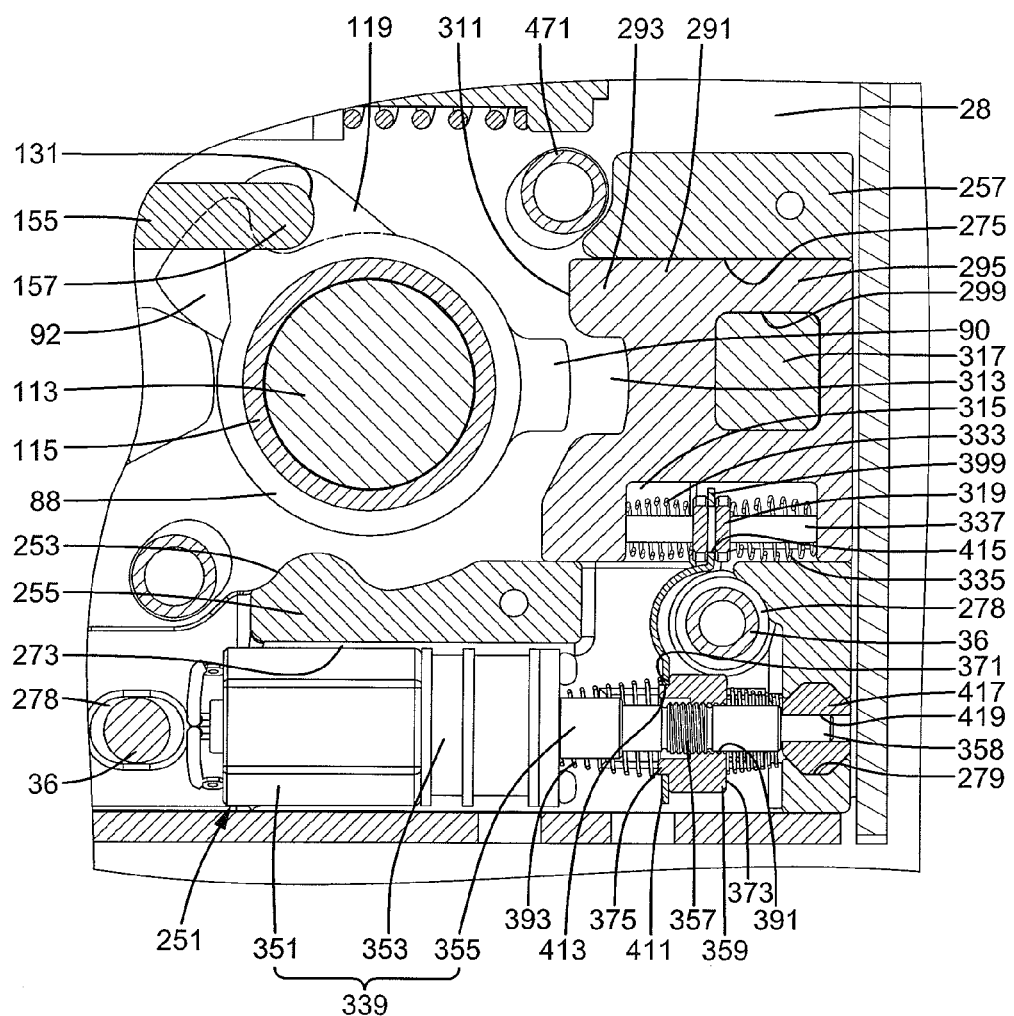
FIG. 7 is a cross sectional view taken along section line 7-7 of FIG. 4.

According to the form shown, locking mechanism 251 includes a locking block 291 slideably received in track 275 of base 253. Locking block 291 includes a narrower portion 295 and a wider portion 293. Wider portion 293 includes two outer surfaces 294 spaced from each other in a width direction perpendicular to the transverse direction. Wider portion 293 further includes an end face 311 extending between outer surfaces 294 and spaced from narrower portion 295. Wider portion 293 further includes a locking groove 313 in end face 311. Narrower portion 295 includes two inner faces 297 between outer surfaces 294 in the width direction. Locking block 291 further includes a through-hole 299 extending from one inner face 297 through the other inner face 297. A receiving groove 315 extends from one outer surface 294 through the other outer surface 294 and extends across wider portion 293 and narrower portion 295. Narrower portion 295 of locking block 291 is slideably received in track 275 of base 253. Wider portion 293 of locking block 291 is located outside of track 275 of base 253. Locking groove 313 faces first protrusion 90 and first projection 137 of unlatching mechanism 86. Locking block 291 is limited by track 275 and is movable in the transverse direction between a front position (FIGS. 11 and 12) and a rear position (FIGS. 5-7). Furthermore, a threaded section 357 of driving shaft 355 has a length in the transverse direction slightly larger than a spacing between the rear position and the front position of locking block 291 in the transverse direction.

Figure 12:
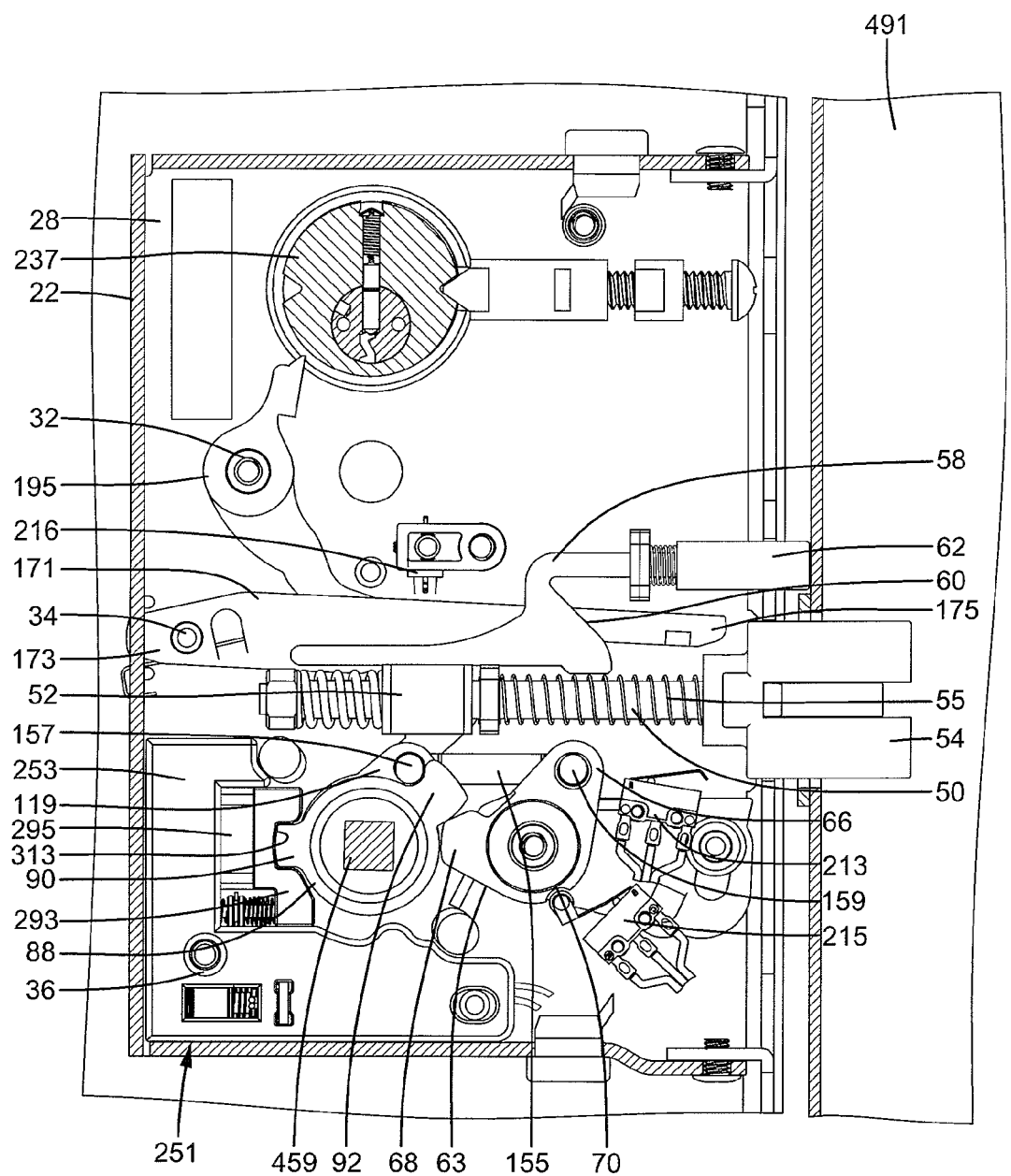
FIG. 12 is a view similar to FIG. 6 with the locking block moved from the rear position to the front position.
Figure 13:
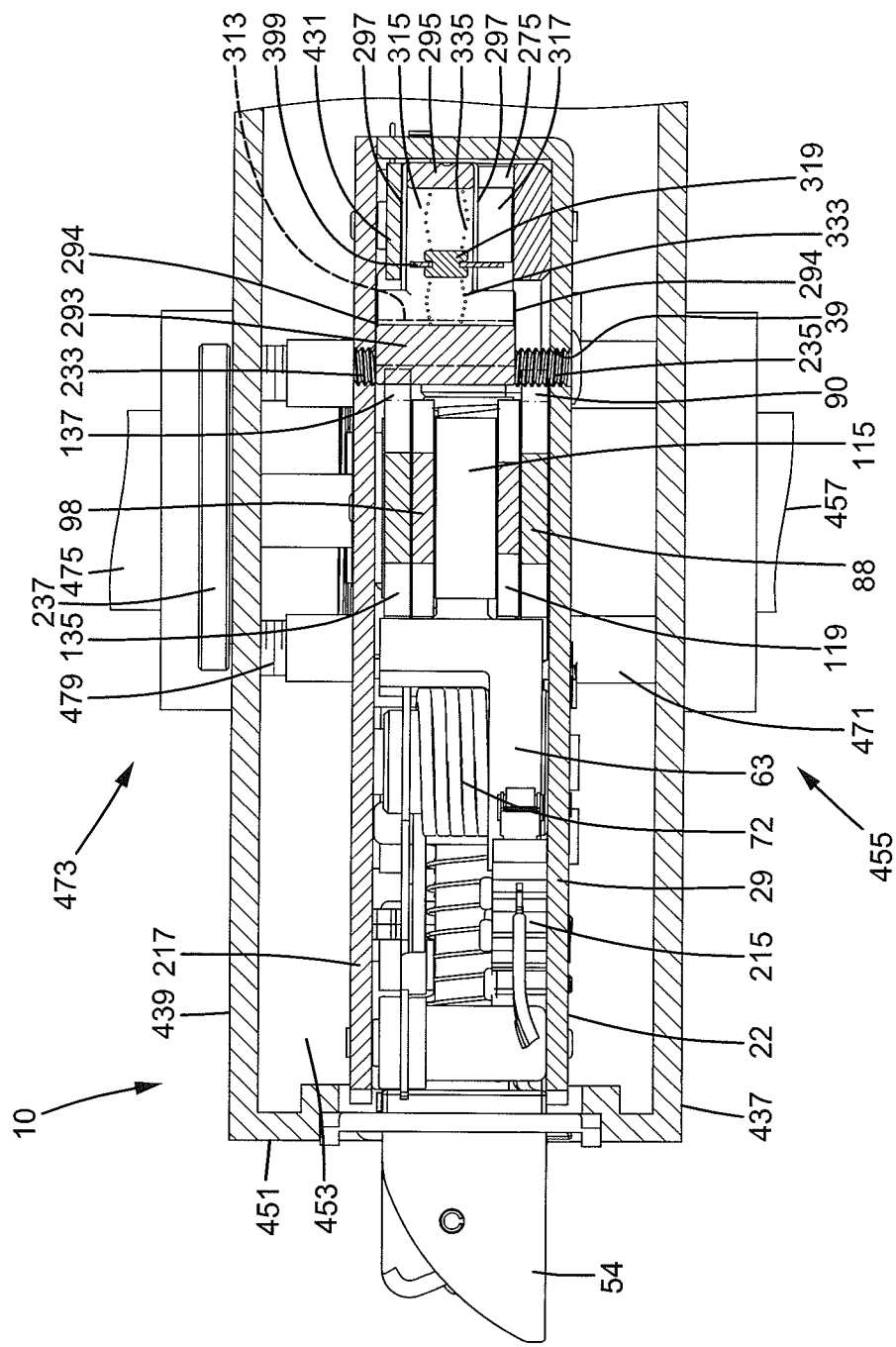
FIG. 13 is a view similar to FIG. 8 with the switching screw coupled with a first screw hole and with the locking block biased to a second position.

According to the form shown, locking mechanism 251 further includes a guiding block 317 received in through-hole 299 of locking block 291. Two ends of guiding block 317 respectively abut a bottom of track 275 of base 253 and an inner face of cover plate 431. Thus, the guiding block 317 and the locking block 291 are jointly moveable between the rear position and the front position of locking block 291. Furthermore, since a spacing between inner faces 297 of narrower portion 295 of locking block 291 is smaller than the spacing between the bottom of track 275 and the inner face of cover plate 431 (see FIGS. 8 and 12), locking block 291 is moveable in an axial direction of guiding block 317 parallel to the width direction between a first position adjacent to side 29 of case 22 (FIG. 8) and a second position adjacent to the lid 217 (FIG. 13).

According to the form shown, a shaft 337 is mounted in receiving groove 315 of locking block 291. A first sliding block 319, a first compression spring 333, and a second compression spring 335 are slideably mounted around shaft 337. First sliding block 319 includes an annular groove 331 in an outer periphery thereof. First sliding block 319 is located between first and second compression springs 333 and 335. First sliding block 319 is biased by first and second compression springs 333 and 335 to a central position in a central portion of receiving groove 315 (FIG. 7).

According to the form shown, locking mechanism 251 further includes an electric driving device 339 received in base 253. Electric driving device 339 includes a motor 351, a speed reducing mechanism 353 coupled to motor 351, and a driving shaft 355 coupled to speed reducing mechanism 353. Driving shaft 355 includes an end 358 distant to speed reducing mechanism 353. Threaded section 357 is formed on an intermediate portion of an outer periphery of driving shaft 355. End 358 of driving shaft 355 is pivotably received in a pivotal hole 419 of a pivotal block 417. Electric driving device 339 is received in groove 273 of base 253 and is pivotably connected to pivotal block 417 received in positioning groove 279 of base 253. Driving shaft 355 is driven by motor 351 to rotate slowly via transmission by speed reducing mechanism 353.

According to the form shown, locking mechanism 251 further includes a second sliding block 359, third and fourth compression springs 393 and 395, and a follower plate 397, all of which are received in groove 273 of base 253. Second sliding block 359 includes first and second faces 371 and 373 and a screw hole 391 extending from first face 371 through second face 373. Second sliding block 359 further includes first and second lugs 377 and 379 on two ends thereof and an engagement portion 375 on first face 371.

According to the form shown, second sliding block 359 and third and fourth compression springs 393 and 395 are mounted around driving shaft 355. Second sliding block 359 is located between third and fourth compression springs 393 and 395. Third compression spring 393 is located between second sliding block 359 and speed reducing mechanism 353. Fourth compression spring 395 is located between second sliding block 359 and pivotal block 417. First lug 377 is slideably received in first sliding groove 277 of base 253. Second lug 379 is slideably received in second sliding groove 433 of cover plate 431. Furthermore, screw hole 391 of second sliding block 359 is in threading connection with threaded section 357 of driving shaft 355. Thus, when driving shaft 355 rotates in a forward direction, second sliding block 359 is pushed to move towards unlatching mechanism 86 in the transverse direction and compresses third compression spring 393. On the other hand, when motor 351 drives driving shaft 355 to rotate in a reverse direction, second sliding block 359 is pushed to move away from unlatching mechanism 86 and compresses fourth compression spring 395.

According to the form shown, follower plate 397 includes first and second portions 399 and 411. Follower plate 397 further includes a connecting groove 415 in first portion 399 and a connecting hole 413 in second portion 411. A peripheral wall of connecting groove 415 of first portion 399 of follower plate 397 engages with annular groove 331 of first sliding block 319. Connecting hole 413 of second portion 411 engages with engagement portion 375 of second sliding block 359. Thus, first and second sliding blocks 319 and 359 and follower plate 397 are jointly moveable in the transverse direction.

According to the form shown, in order to detect the status of latch device 20, a first sensor 213, a second sensor 215, and a third sensor 216 are mounted in chamber 28 of case 22. First sensor 213 is located below latch head 54 in the vertical direction. When latch head 54 is in the latching position, latch head 54 is spaced from first sensor 213 (FIG. 5). When latch head 54 is in the unlatching position, latch head 54 presses against first sensor 213 (FIG. 9). Second sensor 215 is located below returning member 63 in the vertical direction. When first follower ring 98 of unlatching mechanism 86 is in the release position, an activation rod of second sensor 215 is received in recess 70 of returning member 63 (FIG. 5). When first follower ring 98 of unlatching mechanism 86 is in the pressing position, recess 70 of returning member 63 disengages from the activation rod of second sensor 215, and returning member 63 presses against second sensor 215 (FIG. 9). Third sensor 216 is located above stop member 171 in the vertical direction. When stop member 171 is in a non-blocking position, stop member 171 presses against third sensor 216. When stop member 171 is in the blocking position, stop member 171 does not press against third sensor 216. First, second, and third sensors 213, 215, and 216 can be electrically connected to a door access control system or a burglarproof system such that the door access control system or the burglarproof system can monitor the status of latch device 20.

Figure 5A:
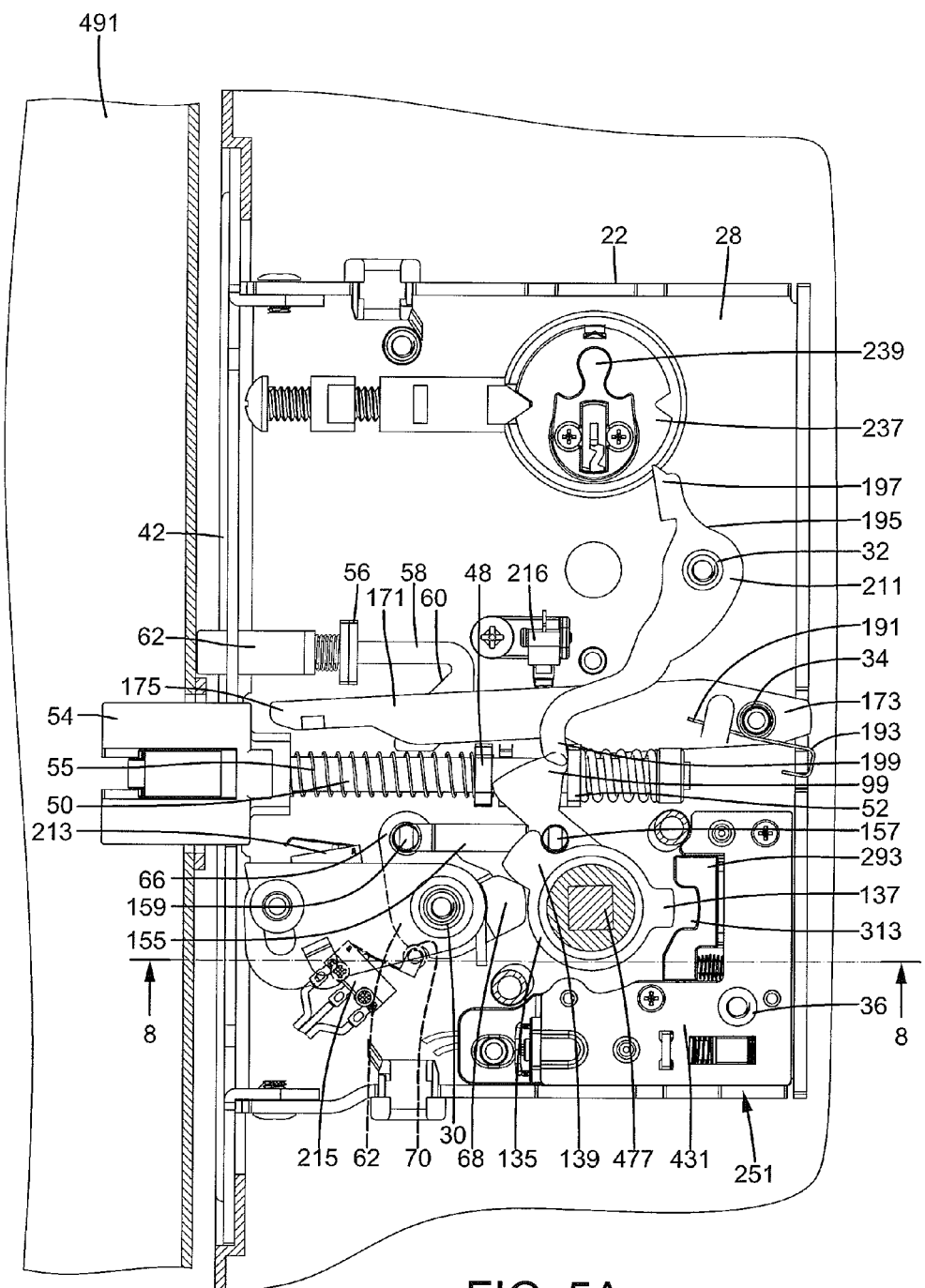
FIG. 5A is a view similar to FIG. 5 with the door in a closed position.
Figure 5B:
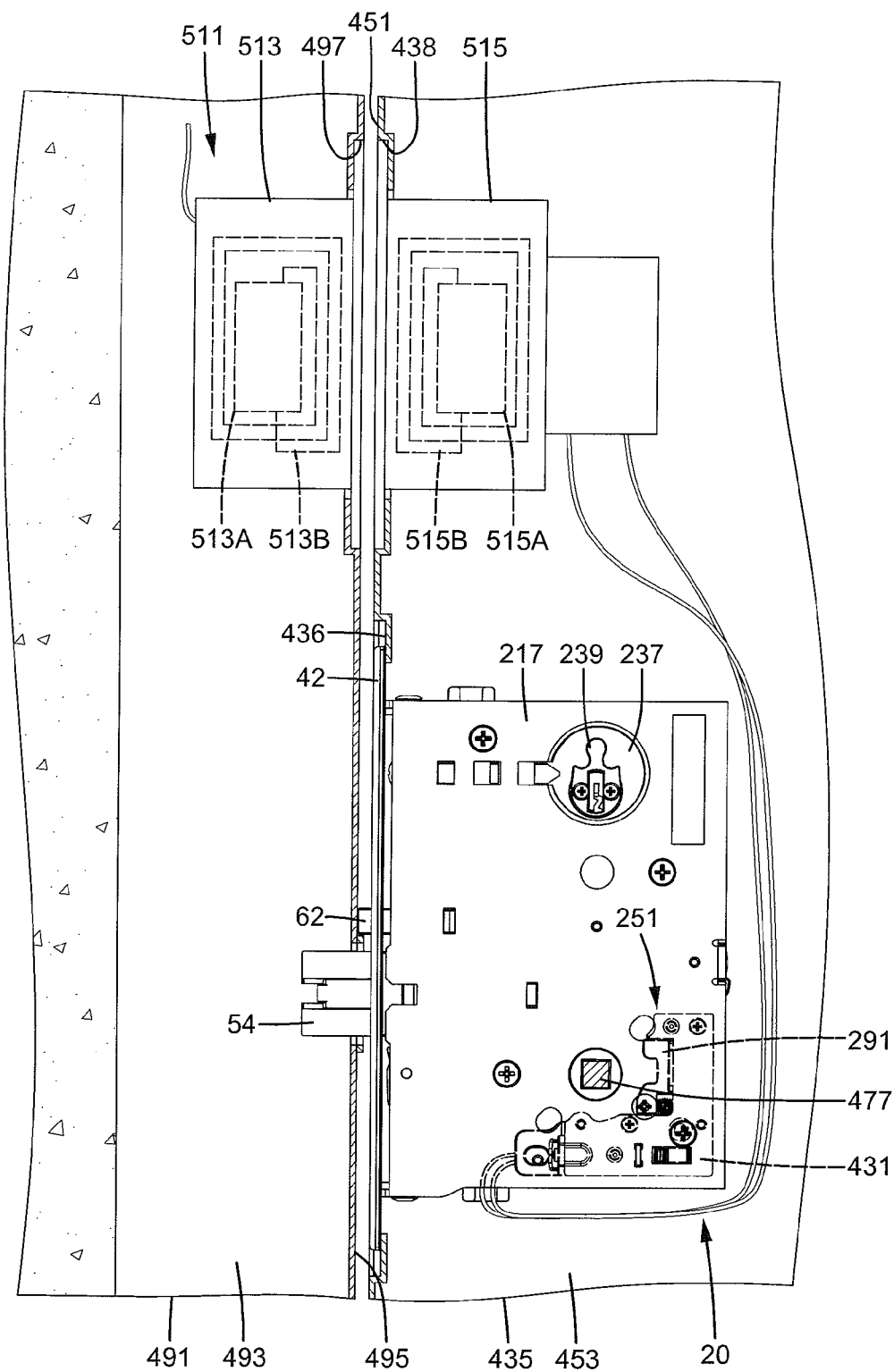
FIG. 5B is a view similar to FIG. 5A with the door in the closed position and with a receiver and a transmitter of the wireless charging device aligned with each other.

Latch device 20 is mounted in a door 435. Door 435 includes first and second sides 437 and 439 and an end face 451 extending between first and second sides 437 and 439. Door 435 further includes an installation space 453 defined by first and second sides 437 and 439 and end face 451. A first installation groove 436 is defined in end face 451 and is in communication with installation space 453. A second installation groove 438 is defined in end face 451, is spaced from first installation groove 436 in the vertical direction, and is in communication with installation space 453. Door 435 is pivotably mounted to an inner side of a door frame 491 fixed to a wall of a passage. Door frame 491 includes a compartment 493 and an inner end face 495. A coupling groove 497 is defined in inner end face 495 and is aligned with second installation groove 438. A latch hole 499 is defined in inner end face 495, is in communication with compartment 493, and is aligned with first installation groove 436. A side of door 435 is mounted by hinges to door frame 491, permitting door 435 to pivot relative to door frame 491 about a pivotal axis defined by the hinges between an open position (FIG. 5) and a closed position (FIGS. 5A and 5B). When door 435 is in the open position, end face 451 of door 435 is spaced from inner end face 495 of door frame 491 in a circumferential direction about the pivotal axis of door 435. When door 435 is in the closed position, end face 451 of door 435 is aligned with inner end face 495 of door frame 491.

Faceplate 42 is received in first installation groove 436 of door 435. Case 22 is received in installation space 453. First operating device 455 is mounted to first side 437 of door 435. Second operating device 473 is mounted to second side 439 of door 435.

According to the form shown, first operating device 455 includes two mounting posts 471 extending through door 435 and case 22. First operating device 455 further includes a first spindle 459 and a first handle 457 connected to first spindle 459. First spindle 459 extends through first side 437 of door 435 and case 22 and is coupled to first driven ring 88, permitting joint pivotal movement of first driven ring 88 and first spindle 459. Thus, when first handle 457 is pivoted, first spindle 459 is driven to pivot first driven ring 88.

According to the form shown, second operating device 473 includes two bolts 479 extending through door 435 and threadedly engaged with mounting posts 471. Second operating device 473 includes a second spindle 477 and a second handle 475 connected to second spindle 477. Second spindle 477 extends through second side 439 of door 435 and lid 217 and is coupled to second driven ring 135, permitting joint pivotal movement of second driven ring 135 and second spindle 477. Thus, when second handle 475 is pivoted, second spindle 477 is driven to pivot second driven ring 135.

According to the form shown, door lock 10 further includes a lock cylinder 237. Lock cylinder 237 includes an actuating plate 239 pivotably mounted to an end thereof. In an example, lock cylinder 237 extends through first side 437 of door 435 and is in threading connection with first engagement hole 40. In another example, lock cylinder 237 extends through second side 439 of door 435 and is in threading connection with second engagement hole 231 of lid 217. Specifically, door 435 divides a space into an indoor space and an outdoor space. Lock cylinder 237 is generally mounted to the side facing the outdoor space. Locking mechanism 251 can accordingly be adjusted to locate locking block 291 in the first or second position.

According to the form shown, door lock 10 further includes a wireless charging device 511. Wireless charging device 511 includes a transmitter 513 and a receiver 515. Transmitter 513 includes a wireless transmitting circuit 513A and an antenna 513B electrically connected to wireless transmitting circuit 513A. Receiver 515 includes a charging circuit 515A and an antenna 515B electrically connected to charging circuit 515A. Receiver 515 further includes a battery 517 electrically connected to charging circuit 515A.

Receiver 515 is fixed in second installation groove 438 of door 435 and is received in installation space 453. Battery 517 is electrically connected to motor 351 of locking mechanism 251 to provide electricity required for rotating motor 351. Transmitter 513 is fixed in coupling groove 497 and is received in compartment 493. Transmitter 513 is electrically connected to a mains power or a terminal of any other power supply to obtain the electricity required for operation of transmitter 513.

Now that the basic construction of door lock 10 has been explained, the operation and some of the advantages of door lock 10 can be set forth and appreciated. In particular, for the sake of explanation, it will be assumed that first side 437 of door 435 in FIGS. 1-12 is the outer side, and second side 439 of door 435 is the inner side. Lock cylinder 237 extends through first side 437 and is in threading connection with first engagement hole 40 of case 22. A switching screw 235 threadedly engages with second screw hole 233 of lid 217 and presses against one of outer surfaces 294 of locking block 291 to bias locking block 291 to the first position (FIG. 8). Thus, locking groove 313 of locking block 291 is aligned with first driven ring 88 in the axial direction of guiding block 317 and is spaced from second driven ring 135 in the axial direction of guiding block 317.

FIG. 5 shows door 435 in an open position. Receiver 515 of wireless charging device 511 is spaced from transmitter 513 in the circumferential direction about the pivotal axis of door 435. Thus, receiver 515 cannot receive the radio wave from transmitter 513 to charge battery 517. In this case, latch head 54 is in the latching position. Safety bolt 62 extends beyond faceplate 42. Follower arm 177 of stop member 171 is stopped by push face 60 of stem 58 and is retained in the non-blocking position permitting movement of latch head 54 from the latching position to the unlatching position. Locking block 291 is in the rear position. Locking groove 313 of locking block 291 is spaced from first protrusion 90 of first driven ring 88 and first projection 137 of second driven ring 135 in the transverse direction, permitting first handle 457 and second handle 475 to actuate first follower ring 98 from the release position to the pressing position. Thus, door lock 10 is set to be in an unlocking state. Furthermore, third sensor 216 is pressed when stop member 171 is in the non-blocking position, such that the door access control system or the burglarproof system can detect door 435 is in the open position.

With reference to FIG. 5A, if door 435 is moved from the open position to the closed position, receiver 515 of wireless charging device 511 is aligned with transmitter 513 in the circumferential direction about the pivotal axis of door 435 (FIG. 5B). Thus, receiver 515 is close to transmitter 513 such that receiver 515 can receive the radio wave from transmitter 513, can convert the radio wave into electricity, and can store the electricity in battery 517. Latch head 54 extends into latch hole 499 of door frame 491. Safety bolt 62 is pressed by inner end face 495 of door frame 491 and retracts into chamber 28 of case 22. Thus, stop member 171 is pressed by first tang 191 of second torsion spring 179 and pivots from the non-blocking position (FIG. 5) to the blocking position (FIG. 5A). Stop end 175 pivots to a movement path of latch head 54 between the latching position and the unlatching position. Thus, picking of latch head 54 via a gap between door 435 and door frame 491 is prevented. When stop member 171 is in the blocking position, third sensor 216 is not pressed, and the door access control system or the burglarproof system can detect door 435 is in the closed position.

When first handle 457 of first operating device 455 pivots in the state shown in FIG. 5A, first driven ring 88 is driven by first spindle 459, and second protrusion 92 of first driven ring 88 presses against and moves bridging member 155. Then, bridging member 155 actuates first and second follower rings 98 and 119 to pivot from the release position to the pressing position about the pivot axis defined by first and second pivotal holes 38 and 219. At the same time, bridging member 155 actuates returning member 63 to pivot about the first pivot axis defined by first axle 30 and to twist first torsion spring 72 by second tang 76 to create the returning force. Returning member 63 presses against second sensor 215, and the door access control system or the burglarproof system detects that somebody is opening door 435. Follower portion 99 of first follower ring 98 presses against shank 50 while first follower ring 98 of unlatching mechanism 86 pivots from the release position to the pressing position, and latch head 54 moves from the latching position to the unlatching position. Connecting member 52 presses against stop member 171 while latch head 54 moves from the latching position to the unlatching position, moving stop member 171 from the blocking position to the non-blocking position to permit movement of latch head 54 from the latching position to the unlatching position. At the same time, latch head 54 presses against push face 60 of stem 58 and actuates safety bolt 62 to retract into chamber 28 of case 22 while stop end 175 of stop member 171 is retained in the non-blocking position by latch head 54. After first follower ring 98 of unlocking mechanism 86 has reached the pressing position, latch head 54 is in the unlatching position (FIG. 9) outside of latch hole 499, permitting opening of door 435. Furthermore, first sensor 213 is pressed by latch head 54 such that the door access control system or the burglarproof system detects that latched head 54 is in the unlatching position.

If first handle 457 of first operating device 455 is released after door 435 has been opened, first spring 55 biases latch head 54 from the unlatching position to the latching position. At the same time, first torsion spring 72 biases returning member 63 to pivot and causes first and second follower rings 98 and 119 and first driven ring 88 to pivot from the pressing position to the release position, returning first handle 457 to the original, horizontal position. Since safety bolt 62 is not stopped by door frame 491, second spring 65 biases safety bolt 62 to extend beyond faceplate 42. Furthermore, push face 60 of stem 58 presses against follower arm 177 of stop member 171 to pivot stop member 171 from the blocking position to the non-blocking position.

If second handle 475 of second operating device 473 pivots in the state shown in FIG. 5A, second spindle 477 is actuated by second driven ring 135 to pivot, and second projection 139 of second driven ring 135 presses against first engagement end 157 of bridging member 155. Thus, bridging member 155 actuates first and second follower rings 98 and 119 to pivot from the release position to the pressing position about the pivot axis defined by first and second pivotal holes 38 and 219. At the same time, bridging member 155 actuates returning member 63 to pivot about the first pivot axis defined by first axle 30 and twists first torsion spring 72 by second tang 76 to create the returning force. Returning member 63 presses against second sensor 215, and the door access control system or the burglarproof system detects that somebody is opening door 435. Follower portion 99 of first follower ring 98 presses against shank 50 while first follower ring 98 of unlatching mechanism 86 pivots from the release position to the pressing position, and latch head 54 moves from the latching position to the unlatching position. Connecting member 52 presses against stop member 171 while latch head 54 moves from the latching position to the unlatching position, moving stop member 171 from the blocking position to the non-blocking position to permit movement of latch head 54 from the latching position to the unlatching position. At the same time, latch head 54 presses against push face 60 of stem 58 and actuates safety bolt 62 to retract into chamber 28 of case 22 while stop end 175 of stop member 171 is retained in the non-blocking position by latch head 54. After first follower ring 98 of unlocking mechanism 86 has reached the pressing position, latch head 54 is in the unlatching position (FIG. 10) permitting opening of door 435. Furthermore, first sensor 213 is pressed by latch head 54 such that the door access control system or the burglarproof system detects that latched head 54 is in the unlatching position.

If second handle 475 of second operating device 473 is released after door 435 has been opened, first spring 55 biases latch head 54 from the unlatching position to the latching position. At the same time, first torsion spring 72 biases returning member 63 to pivot and causes first and second follower rings 98 and 119 and first driven ring 88 to pivot from the pressing position to the release position, returning second handle 475 to the original, horizontal position. Since safety bolt 62 is not stopped by door frame 491, second spring 65 biases safety bolt 62 to extend beyond faceplate 42. Furthermore, push face 60 of stem 58 presses against follower arm 177 of stop member 171 to pivot stop member 171 from the blocking position to the non-blocking position.

Figure 11:
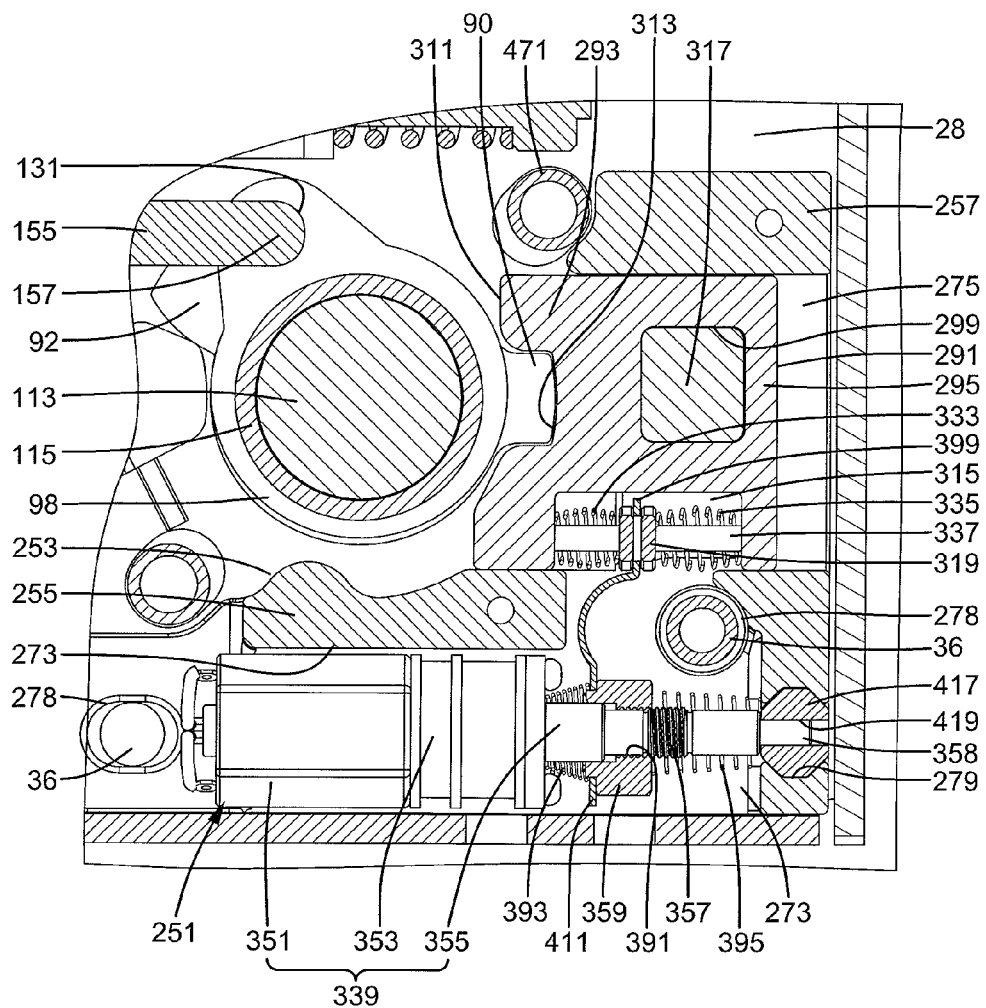
FIG. 11 is a view similar to FIG. 7 with the locking block moved from a rear position to a front position.

Still referring to FIG. 5A, when door 435 is closed, wired or wireless control can be used to activate motor 351 of electric driving device 339 to thereby rotate driving shaft 355 in the forward direction by using the electricity of battery 517. Specifically, when first follower ring 98 of unlatching mechanism 86 is in the release position, first protrusion 90 of first driven ring 88 and first projection 137 of second driven ring 135 are aligned with locking groove 313 of locking block 291. Thus, when driving shaft 355 rotates in the forward direction, driving shaft 355 actuates second sliding block 359 to move towards unlatching mechanism 86 and to compress third compression spring 393 in the transverse direction, which, in turn, causes follower plate 397 to push first sliding block 319 to move towards unlatching mechanism 86 in the transverse direction. Since locking block 291 is not blocked, first compression spring 333 presses against and moves locking block 291 from the rear position (FIG. 5A) to the front position (FIGS. 11 and 12). Since locking block 291 is also in the first position, locking groove 313 of locking block 291 engages with first protrusion 90 of first driven ring 88. Thus, first driven ring 88 cannot pivot about the pivot axis defined by first and second pivot holes 38 and 219. As a result, first handle 457 of first operating device 455 cannot pivot, and door lock 10 is set to be in a locking state. In this case, if it is desired to open door 435 from the outside, a key can be used to release the locking state of lock cylinder 237 and pivots actuating plate 239 to press against first end 197 of unlatching member 195, pivoting unlatching member 195 about the second pivot axis defined by second axle 32. Furthermore, second end 199 of unlatching member 195 presses against shank 50 to move latch head 54 from the latching position to the unlatching position, and door 435 can be opened.

In a case that first operating device 455 cannot unlatch latch head 54, and since second driven ring 135 does not engage with locking block 291, latch head 54 can be moved from the latching position to the unlatching position by operating second handle 475 of second operating device 473.

If it is desired to release locking of first driven ring 88 by locking mechanism 251, motor 351 of electric driving device 339 can be activated to rotate driving shaft 355 in the reverse direction by using the electricity of battery 517. Threaded section 357 of driving shaft 355 pushes fourth compression spring 395 to move away from unlatching mechanism 86 in the transverse direction, and follower plate 397 and first and second sliding blocks 319 and 359 move jointly to cause second compression spring 335 to press against and move locking block 291 from the front position to the rear position. Thus, locking groove 313 of locking block 291 disengages from first protrusion 90 of first driven ring 88, permitting first driven ring 88 to pivot about the pivot axis defined by first and second pivot holes 38 and 219. As a result, first handle 457 of first operating device 455 can be operated to open door 435.

In another case that first side 437 of door 435 is the inner side and that second side 439 of door 435 is the outer side, lock cylinder 237 extends through second side 439 of door 435 and threadedly engages with second engagement hole 231 of lid 217 (FIG. 13). Switching screw 235 extends through first screw hole 39 of case 22 and abuts one of outer surfaces 294 of locking block 291, such that locking block 291 is biased by switching screw 235 to the second position. Thus, locking block 291 is aligned with second driven ring 135 in the axial direction of guiding block 317 and is spaced from first driven ring 88 in the axial direction of guiding block 317.

Figure 14:
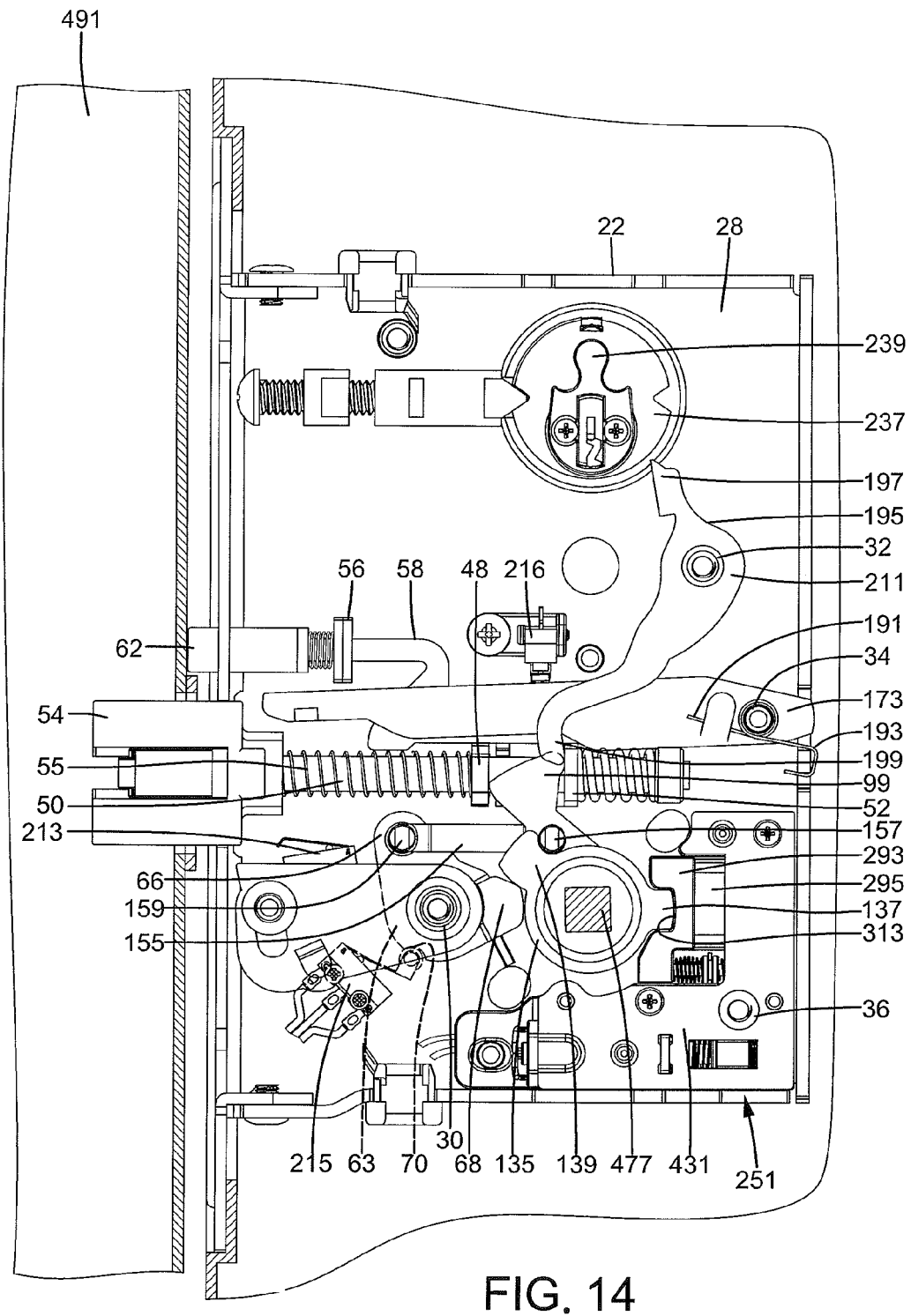
FIG. 14 is a view similar to FIG. 6 with the switching screw coupled with the first screw hole, with the locking block biased to the second position, and with the locking block moved to the front position.

With reference to FIG. 14, when door 435 is closed and when locking block 291 is in the front position, first projection 137 of second driven ring 135 engages with locking groove 313 of locking block 291, such that second driven ring 135 cannot pivot about the pivot axis defined by first and second pivotal holes 38 and 219. Furthermore, second handle 475 cannot pivot. Thus, a user can not open door 435 by operating second operating device 473. If it is desired to open door 435 from the outside, a key is used to pivot actuating plate 239 to move latch head 54 from the latching position to the unlatching position while compressing first spring 55.

While second operating device 473 cannot unlatch latch head 54, and since first driven ring 88 does not engage with locking block 291, door 435 can be opened by operating first handle 457 of first operating device 455 to move latch head 54 from the latching position to the unlatching position.

Figure 15:
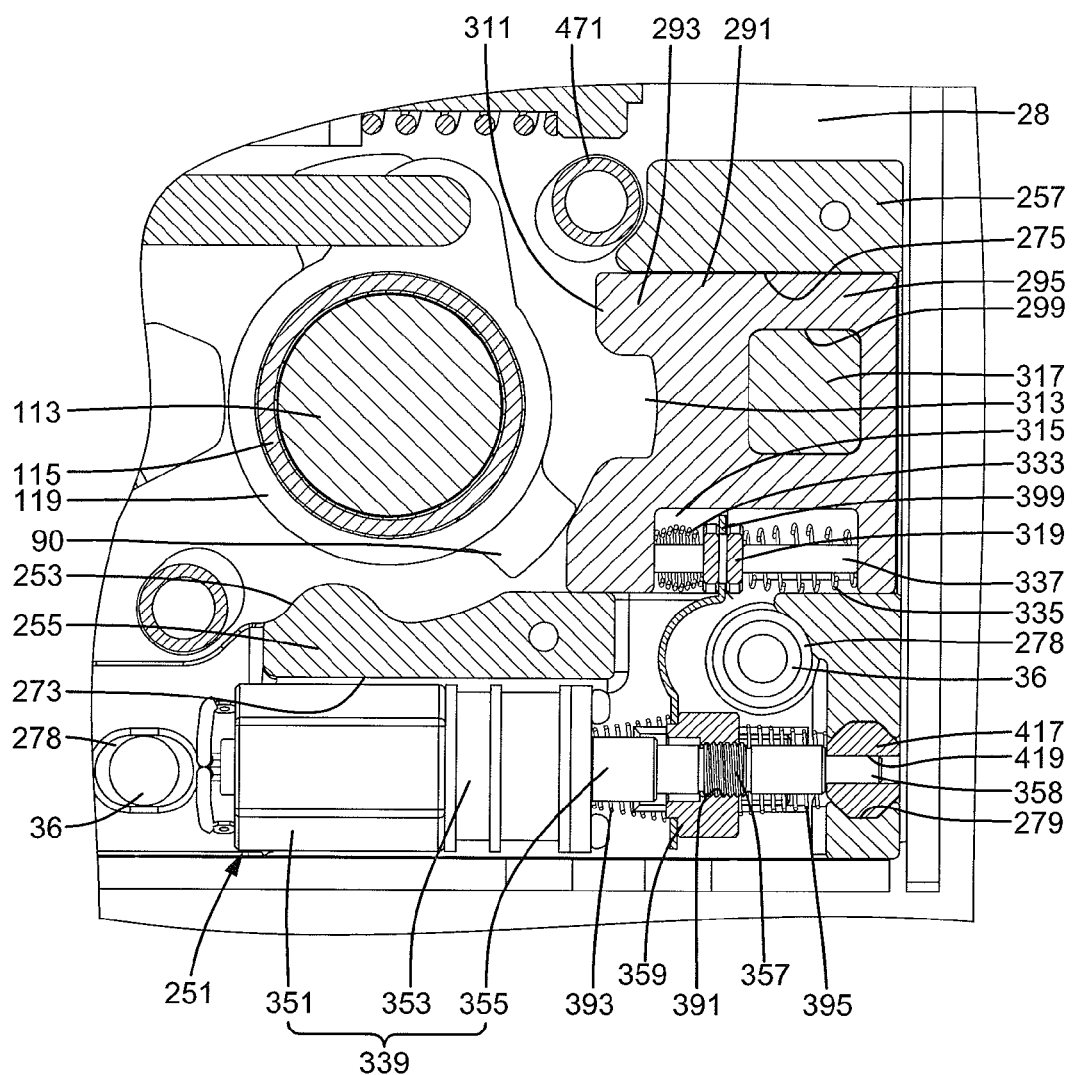
FIG. 15 is a view similar to FIG. 7 with the first handle pivoted to move the latch from the front position to the rear position, with a driving shaft rotated in a forward direction, with the locking block remaining in the rear position, and with a first sliding block moved to a non-central position.

In addition to the locking function provided by locking mechanism 251, door lock 10 permits mistaken operation. Specifically, when door lock 10 is in a state shown in FIG. 10, latch head 54 is in the unlatching position, locking block 291 is in the first position, and first protrusion 90 of first driven ring 88 is not aligned with locking groove 313 of locking block 291. Since first protrusion 90 of first driven ring 88 is in the movement path of locking block 291 from the rear position to the front position, and if driving shaft 355 is driven to rotate in the forward direction, second sliding block 359 moves towards unlatching mechanism 86 in the transverse direction and compresses third compression spring 393. However, locking block 291 is retained in the rear position by first protrusion 90 of first driven ring 88 (FIG. 15). Thus, first sliding block 319 moves from the central position to the non-central position (towards unlatching mechanism 86 in the transverse direction) and compresses first compression spring 333. When first driven ring 88 is returned to a position in which first protrusion 90 is aligned with locking groove 313 of locking block 291 (namely, first follower ring 98 is in the release position), first compression spring 333 presses locking block 291 from the rear position to the front position. Note that the mistaken operation is also effective when locking block 291 is in the second position.

Figure 16:
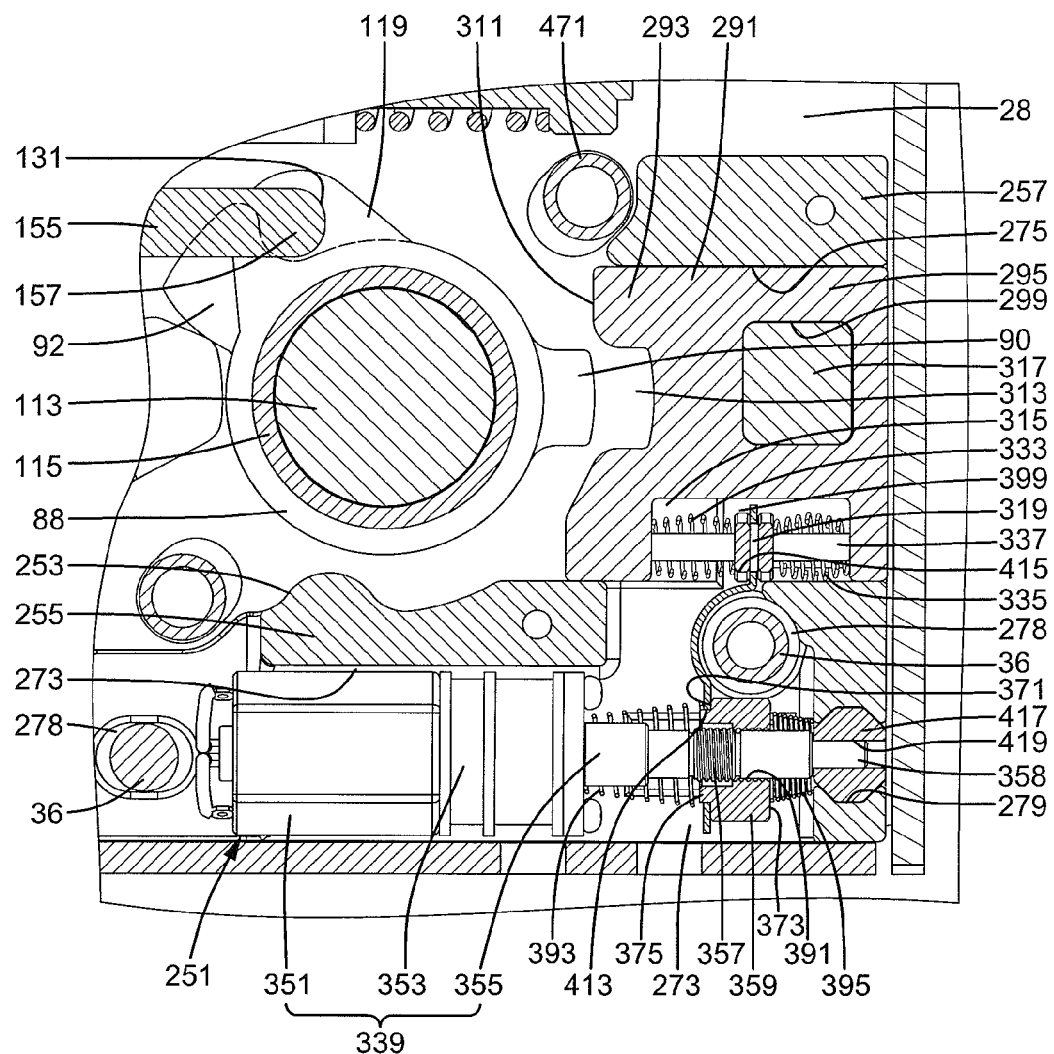
FIG. 16 is a view similar to FIG. 7 with the driving shaft rotated in a reverse direction and with the first sliding block moved to the non-central position.

Locking mechanism 251 further permits another mistaken operation. Specifically, referring to FIG. 7, when locking block 291 is in the rear position, and if motor 351 drives driving shaft 355 to rotate in the reverse direction, second sliding block 359 moves away from unlatching mechanism 86 in the transverse direction and compresses fourth compression spring 395. Furthermore, first sliding block 319 is actuated to move from the central position to the non-central position and compresses second compression spring 335. However, after first and second sliding blocks 319 and 359 have moved through a small distance away from unlatching mechanism 86 in the transverse direction, screw hole 391 of second sliding block 359 disengages from threaded section 357 of driving shaft 355. Thus, driving shaft 355 cannot keep actuating first and second sliding blocks 319 and 359 away from unlatching mechanism 86 in the transverse direction (FIG. 16). Since fourth compression spring 395 biases second sliding block 359, and even though screw hole 391 of second sliding block 359 has disengaged from threaded section 357 of driving shaft 355, the end face of screw hole 391 of second sliding block 359 still abuts an end of threaded section 357 of driving shaft 355. This assures that threaded section 357 of driving shaft 355 will immediately engage with screw hole 391 of second sliding block 359 while driving shaft 355 starts to rotate in the forward direction.

Wireless charging device 511 can continuously charge battery 517 while door 435 is in the closed position, greatly increasing the operation time of door lock 10 while reducing the possibility of malfunction of door lock 10 resulting from shortage of electricity of battery 517. Furthermore, since battery 517 will be charged while door 435 is in the closed position, the battery replacement frequency can be reduced to increase the use convenience of electrically controlled door lock 10.

Locking mechanism 251 will not change the original set state even if a power interruption of battery 517 occurs. Namely, no matter whether latch device 20 is set to be in the locking or unlocking state, locking mechanism 251 will not change the locking or unlocking state even if a power interruption of battery 517 occurs, which is advantageous to door access control.

Locking mechanism 251 permits wired or wireless control to activate electric driving device 339, which controls locking block 291 to be in the front position (in which door lock 10 is set to be in the locking state) or the rear position (in which door lock 10 is set to be in the unlocking state), which is advantageous to cooperate with a control system, such as a door access control system or a burglarproof system.

Locking mechanism 251 permits mistaken operation. Namely, when locking block 291 cannot move, motor 351 can still be activated to rotate driving shaft 355, which, in turn, moves first and second sliding blocks 319 and 359 in the transverse direction, preventing motor 351 from being damaged by the resistance. Furthermore, when driving shaft 355 rotates in the forward position while locking block 291 is retained in the rear position, since first compression spring 33 is compressed, and if the factor of locking block 291 vanishes (such as release of first handle 457 or second handle 475, which is on the outer side), first compression spring 333 will immediately press locking block 291 to move from the rear position to the front position, avoiding an unreliable setting of door lock 10 due to mistaken operation.

Furthermore, locking block 291 of locking mechanism 251 can rapidly be mounted to be in the first position or the second position according to the indoor and outdoor positions of the site on which door lock 10 is mounted, providing high convenience in installation of door lock 10.

Now that the basic teachings of the present invention have been explained, many extensions and variations will be obvious to one having ordinary skill in the art. For example, wireless charging device 511 can be utilized on door lock 10 of other types than the illustrated type, including, but not limited to, a commercially available type. Furthermore, charging of battery 517 can be achieved by magnetic induction or magnetic resonance.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A door lock comprising:
a latch head slideable in a transverse direction between a latching position and an unlatching position, with the door lock adapted to be mounted to a door, with the latch head in the latching position not permitting pivotal movement of the door from a closed position to an open position, with the latch head in the unlatching position permitting pivotal movement of the door from the closed position to the open position;
a receiver including a charging circuit and an antenna electrically connected to the charging circuit, with the receiver adapted to be mounted to the door and adapted to pivot together with the door between the open position and the closed position;
a battery providing electricity required for moving the latch head between the latching position and the unlatching position or providing electricity required for permitting or not permitting movement of the latch head from the latching position to the unlatching position;
a transmitter including a wireless transmitting circuit and an antenna electrically connected to the wireless transmitting circuit, with the transmitter adapted to be mounted to a door frame to which the door is pivotably mounted, with the transmitter adapted to be connected to a power supply, wherein when the door is in the open position, the receiver is not aligned with the transmitter, and wherein when the door is in the closed position, the receiver is aligned with the transmitter, the receiver receives a radio wave from the transmitter, converts the radio wave into electricity, and stores the electricity in the battery,
a case adapted to be mounted in the door, with the case including a chamber, with the latch head slideably received in the chamber;
an unlatching mechanism pivotably received in the chamber and including a follower portion operatively connected to the latch head, with the follower portion pivotable between a release position and a pressing position;
a locking mechanism mounted in the chamber and electrically connected to the battery, with the locking mechanism including a locking block movable between a front position and a rear position, with the battery providing electricity required for moving the locking block between the front position and the rear position, wherein when the latch head is in the latching position, when the unlatching mechanism pivots from the release position towards the pressing position, the latch head moves from the latching position towards the unlatching position, wherein when the unlatching mechanism is in the pressing position, the latch head is in the unlatching position, wherein when the locking block is in the front position, pivotal movement of the unlatching mechanism from the release position to the pressing position is not permitted, and wherein when the locking block is in the rear position, pivotal movement of the unlatching mechanism from the release position to the pressing position is permitted;
a base fixed in the chamber, with the base including a track and a groove in communication with the track, with the locking block slideably received in the track of the base and including a receiving groove, with the locking block limited by the track and movable in the transverse direction between the front position adjacent to the unlatching mechanism and the rear position distant to the unlatching mechanism;

a shaft mounted in the receiving groove of the locking block;

a first sliding block slideably mounted on the shaft, with the first sliding block limited by the shaft and movable in the transverse direction between a central position in a central portion of the receiving groove and a non-central position not in the central portion of the receiving groove;

a first compression spring mounted around the shaft;

a second compression spring mounted around the shaft, with the first sliding block located between the first and second compression springs, with the first compression spring and the second compression spring biasing the first sliding block to the central position;

an electric driving device mounted in the groove of the base and electrically connected to the battery, with the electric driving device including a driving shaft having a threaded section at an intermediate portion thereof, with the driving shaft controlled to rotate in a forward direction or a reverse direction opposite to the forward direction;

a second sliding block including a screw hole in threading connection with the threaded section of the driving shaft; and a follower plate including a first portion coupled to the first sliding block and a second portion coupled to the second sliding block, wherein when the driving shaft rotates in the forward direction, the second sliding block, the follower plate, and the first sliding block move towards the unlatching mechanism, wherein when the driving shaft rotates in the reverse direction, the second sliding block, the follower plate, and the first sliding block move away from the unlatching mechanism, wherein when the unlatching mechanism is in the release position, rotation of the driving shaft in the forward direction causes movement of the locking block from the rear position towards the front position, wherein when the unlatching mechanism is in the pressing position, the locking block is blocked by the unlatching mechanism, rotation of the driving shaft in the forward position causes the first sliding block to move from the central position to the non-central position and to compress the first compression spring, permitting the locking block to be retained in the rear position, wherein when the locking block is in the rear position, the locking block disengages from the unlatching mechanism, permitting the unlatching mechanism to move from the release position to the pressing position, wherein when the locking block is in the front position, the locking block engages with the unlatching mechanism, not permitting the unlatching mechanism to move from the release position to the pressing position, and wherein when the locking block is in the front position, rotation of the driving shaft in the reverse direction causes movement of the locking block from the front position to the rear position.

2. The door lock as claimed in claim 1, further comprising:

a third compression spring mounted around the driving shaft; and a fourth compression spring mounted around the driving shaft, with the second sliding block located between the third compression spring and the fourth compression spring, wherein when the locking block moves from the rear position towards the front position, the second sliding block compresses the third compression spring, wherein when the locking block moves from the front position to the rear position, the second sliding block compresses the fourth compression spring, wherein when the locking block is in the front position, and when the driving shaft keeps rotating in the forward direction, the second sliding block keeps compressing the third compression spring, the screw hole of the second sliding block disengages from the threaded section of the driving shaft, and the third compression spring biases the screw hole of the second sliding block to abut an end of the threaded section of the driving shaft, and wherein when the locking block is in the rear position, and when the driving shaft keeps rotating in the reverse direction, the second sliding block keeps compressing the fourth compression spring, the screw hole of the second sliding block disengages from the threaded section of the driving shaft, and the fourth compression spring biases the screw hole of the second sliding block to abut another end of the threaded section of the driving shaft.

3. The door lock as claimed in claim 1, with the locking block including a wider portion and a narrower portion, with the wider portion including two outer surfaces spaced from each other in a width direction perpendicular to the transverse direction and an end face extending between the two outer surfaces, with the narrower portion including two inner faces between the two outer surfaces in the width direction, with a locking groove formed in the end face of the wider portion, with the locking block further including a through-hole extending from one of the two inner faces through another of the two inner faces, with the wider portion of the locking block located outside of the track of the base, with the narrower portion located in the track, with the base further including a first side and a second side spaced from each other in the width direction, with the unlatching mechanism further including a first driven ring, a second driven ring, and a first follower ring between the first and second driven rings, with the first driven ring and the second driven ring coupled to and jointly pivotable with the first follower ring, with the first driven ring including a first protrusion on an outer periphery thereof, with the second driven ring including a first projection on an outer periphery thereof, with the follower portion formed on the outer periphery of the first follower ring, with the case further including a side having a first pivotal hole pivotably receiving the first driven ring, with the case further including a first screw hole aligned with the wider portion of the locking block, with the door lock further comprising:

a lid mounted to the case to close the chamber, with the lid including a second pivotal hole pivotably receiving the second driven ring, with the lid further including a second screw hole aligned with the wider portion of the locking block;

a cover plate mounted to the first side of the base, with a spacing between the two inner faces of the locking block smaller than a spacing between a bottom of the track and an inner face of the cover plate;

a guiding block slideably received in the through-hole of the locking block, with the guiding block including two ends respectively abutting the bottom of the track and the inner face of the cover plate, permitting the locking block to move in an axial direction of the guiding block parallel to the width direction between a first position adjacent to the side of the case and a second position adjacent to the lid, with the guiding block and the locking block jointly movable between the front position and the rear position;

a switching screw selectively engaged with the first screw hole of the case or the second screw hole of the lid, wherein when the switching screw engages with the first screw hole of the case, the switching screw biases the locking block to the second position, the locking groove of the locking block is aligned with the first projection of the second driven ring in the axial direction of the guiding block, and the locking groove of the locking block is spaced from the first protrusion of the first driven ring in the axial direction of the guiding block, wherein when the switching screw engages with the second screw hole of the lid, the switching screw biases the locking block to the first position, the locking groove of the locking block is aligned with the first protrusion of the first driven ring in the axial direction of the guiding block, and the locking groove of the locking block is spaced from the first projection of the second driven ring in the axial direction of the guiding block, wherein when the locking block is in the first position and moves from the rear position to the front position, the locking groove of the locking block engages with the first protrusion of the first driven ring, and wherein when the locking block is in the second position and moves from the rear position to the front position, the locking groove of the locking block engages with the first projection of the second driven ring.

4. The door lock as claimed in claim 3, with the base further including a first sliding groove extending from the second side of the base towards the first side of the base and intercommunicating with the groove, with the cover plate further including a second sliding groove aligned with the first sliding groove, with the second sliding block including a first lug and a second lug, with the first lug slideably received in the first sliding groove of the base, and with the second lug slideably received in the second sliding groove of the cover plate.

5. The door lock as claimed in claim 3, with the base further including a positioning groove located between the track and the groove and intercommunicating with the groove, with the driving shaft further including an end distant to the threaded section of the driving shaft, with the door lock further comprising:

a pivotal block detachably received in the positioning groove of the base, with the pivotal block including a pivotal hole, and with the end of the driving shaft pivotably received in the pivotal hole of the pivotal block.

6. The door lock as claimed in claim 1, with the threaded section of the driving shaft having a length in the transverse direction slightly larger than a spacing between the rear position and the front position of the locking block in the transverse direction.

* * * * *